(12) United States Patent
Thomason

(10) Patent No.: US 12,101,332 B1
(45) Date of Patent: Sep. 24, 2024

(54) SYSTEMS AND METHODS FOR A FEDERATED TACTICAL EDGE CLOUD

(71) Applicant: EDJX, Inc., Raleigh, NC (US)

(72) Inventor: James A. Thomason, Las Vegas, NV (US)

(73) Assignee: EDJX, INC., Raleigh, NC (US)

( * ) Notice: Subject to any disclaimer, the term of this patent is extended or adjusted under 35 U.S.C. 154(b) by 208 days.

(21) Appl. No.: 17/496,415

(22) Filed: Oct. 7, 2021

Related U.S. Application Data

(60) Provisional application No. 63/089,872, filed on Oct. 9, 2020.

(51) Int. Cl.
*H04L 9/40* (2022.01)
*H04L 9/32* (2006.01)
*H04W 12/106* (2021.01)

(52) U.S. Cl.
CPC .......... *H04L 63/123* (2013.01); *H04L 9/3239* (2013.01); *H04L 9/3247* (2013.01); *H04L 9/3265* (2013.01); *H04W 12/106* (2021.01)

(58) Field of Classification Search
CPC ... H04L 63/123; H04L 9/3239; H04L 9/3247; H04L 9/3265; H04W 12/106
See application file for complete search history.

(56) References Cited

U.S. PATENT DOCUMENTS

| | | | |
|---|---|---|---|
| 9,420,050 B1 | 8/2016 | Sakata et al. | |
| 9,858,798 B2 | 1/2018 | Ellsworth et al. | |
| 9,880,756 B2 | 1/2018 | Mutalik et al. | |
| 9,904,603 B2 | 2/2018 | Mutalik et al. | |
| 10,104,511 B2 | 10/2018 | Stewart et al. | |
| 10,545,982 B1 | 1/2020 | Kramer et al. | |
| 11,922,074 B1* | 3/2024 | Thomason | H04L 67/1097 |
| 2012/0042075 A1 | 2/2012 | Goetz et al. | |
| 2018/0103013 A1* | 4/2018 | Imai | H04L 63/061 |
| 2018/0183606 A1* | 6/2018 | High | H04L 9/30 |
| 2018/0375841 A1* | 12/2018 | Tola | H04L 63/0227 |
| 2019/0026146 A1* | 1/2019 | Peffers | G06F 9/5044 |
| 2019/0036764 A1 | 1/2019 | Canessa et al. | |
| 2019/0327180 A1 | 10/2019 | Todd et al. | |
| 2020/0019626 A1 | 1/2020 | Todd et al. | |
| 2020/0125604 A1 | 4/2020 | Canessa et al. | |
| 2020/0226123 A1* | 7/2020 | Nixon | H04L 9/3297 |

(Continued)

OTHER PUBLICATIONS

Yang, Xuetao; Li, Yafeng; Chen, Liang; Feng, Wei; Yan, Zheng; "TDL-Chain: An Intelligent Data Transmission Control System in Tactical Data Link Based on Blockchain," IEEE International Conference on Blockchain (Blockchain), Rhodes, Greece, 2020, pp. 305-312.*

(Continued)

*Primary Examiner* — Victor Lesniewski
(74) *Attorney, Agent, or Firm* — NEO IP

(57) ABSTRACT

The present invention is directed to systems and methods for a federated tactical edge cloud. The federated tactical edge cloud systems and methods preferably utilize serverless computing, blockchain, content addressing, conflict-free replicated data types, and notarization or authentication of data blocks to provide data authentication and integrity. The federated tactical edge cloud is operable to access and process data from a plurality of sensors and/or a plurality of edge devices.

19 Claims, 13 Drawing Sheets

(56) References Cited

U.S. PATENT DOCUMENTS

| | | | |
|---|---|---|---|
| 2020/0396302 A1* | 12/2020 | Le | G06F 16/1824 |
| 2021/0089422 A1* | 3/2021 | Kim | G06F 11/3079 |
| 2021/0182244 A1* | 6/2021 | Kaddoura | H04L 67/1097 |
| 2022/0038260 A1* | 2/2022 | Chakra | G06F 16/27 |
| 2023/0062434 A1* | 3/2023 | Wagner | H04L 9/3247 |

OTHER PUBLICATIONS

Benedict, Shajulin; "Serverless Blockchain-Enabled Architecture for IoT Societal Applications," IEEE Transactions on Computational Social Systems, vol. 7, No. 5, pp. 1146-1158, Oct. 2020.*

Dandashi et al., Tactical Edge Characterization Framework—vol. 1: Common Vocabulary for Tactical Environments, MITRE Technical Report, Nov. 2007.

Magar, Alan. "Assessing the Use of Tactical Clouds to Enhance Warfighter Effectiveness." (2014).

Phase 2 ENCODERS Final Report, SRI International, Jun. 8, 2016.

* cited by examiner

SYSTEMS AND METHODS FOR A FEDERATED TACTICAL EDGE CLOUD

CROSS REFERENCES TO RELATED APPLICATIONS

This application is related to and claims priority from U.S. Provisional Patent Application No. 63/089,872, filed Oct. 9, 2020, which is incorporated herein by reference in its entirety.

BACKGROUND OF THE INVENTION

1. Field of the Invention

The present invention relates to edge computing, and more specifically to systems and methods for a federated tactical edge cloud.

2. Description of the Prior Art

It is generally known in the prior art to provide computer resources via a cloud. Presently, computer resources within a cloud provider's network are generally spun up in a cluster (e.g., servers are aggregated in a centralized location, such as a datacenter, etc.). All requests are load-balanced back to that cluster. Unfortunately, such an implementation does not provide the best performance or experience for end users who are located far away from the centralized cluster.

This problem is further compounded by the fact that applications provided within the "cloud" are becoming more robust and require additional resources and computing power, as well as faster response times. Accordingly, the computations being performed over the web are becoming increasingly more intensive. As such, with the centralized cluster approach, many of these computations are being routed away from the user which adds to or even causes delays. This results in a decrease in overall performance and increased latency for users.

Prior art patent documents include the following:

U.S. Pat. No. 9,420,050 for Log reporting for a federated platform by inventors Sakata, et al., filed Aug. 31, 2011 and issued Aug. 16, 2016, is directed to a log reporting system for a federation of independently operated CDNs so that logs, performance, analytics, and billing can be obtained for customers irrespective of which servers of which federation participants the customers' configurations are deployed to. The system includes a log aggregator, splitter, management agent, archival storage, dissemination agent, data log analyzer, and portal. The log aggregator aggregates server logs from servers of the federation participants. The splitter produces customer logs by regrouping the server logs on a per customer basis irrespective of which servers of which federation participants produced entries for each customer. The management agent controls operations of the archival storage, dissemination agent, and log analyzer. The archival storage archives customer logs. The dissemination agent disseminates customer logs. The log analyzer processes the customer logs to produce reports, analytics, and billing. The portal is an interface to access the customer logs.

U.S. Pat. No. 10,545,982 for Federated search of multiple sources with conflict resolution by inventors Kramer, et al., filed Jul. 23, 2015 and issued Jan. 28, 2020, is directed to methods and apparatuses related to federated search of multiple sources with conflict resolution. A method may comprise obtaining a set of data ontologies (e.g., types, properties, and links) associated with a plurality of heterogeneous data sources; receiving a selection of a graph comprising a plurality of graph nodes connected by one or more graph edges; and transforming the graph into one or more search queries across the plurality of heterogeneous data sources. A method may comprise obtaining a first data object as a result of executing a first search query across a plurality of heterogeneous data sources; resolving, based on one or more resolution rules, at least the first data object with a repository data object; deduplicating data associated with at least the first data object and the repository data object prior to storing the deduplicated data in a repository that has a particular data model.

U.S. Pat. No. 9,858,798 for Cloud based command and control system integrating services across multiple platforms by inventors Ellsworth, et al., filed Apr. 7, 2014 and issued Jan. 2, 2018, is directed to a command and control system which links users and platforms in real time and with touch screen ease, delivering a highly intuitive, integrated user experience with minimal infrastructure. Capitalizing on a cloud based architecture, from the cloud, to the touch table, to a hand held device, the command and control system creates seamless connections between sensors, leaders and users for up-to-the-minute information clarity.

U.S. Patent Publication No. 20120042075 for Adaptive services command and control infrastructure by inventors Goetz, et al., filed Aug. 16, 2010 and published Feb. 16, 2012, is directed to a software component that adapts resource utilization to match the needs of operational events in a mobile ad hoc network (MANET) environment such as the military tactical edge. The resources can include network resources and grid computing resources.

U.S. Pat. No. 10,104,511 for Recommendations and notifications over limited connections by inventors Stewart, et al., filed Nov. 12, 2016 and issued Oct. 16, 2018, is directed to systems, devices, and methods for providing recommendations and notifications to an end user. A system can include an intelligence server including a common message server (CMS), query manager circuitry, an intelligence database, and alerting service circuitry, the CMS communicatively coupled between each of the query manager circuitry and the intelligence database, and the alerting service circuitry and the query manager circuitry, an intelligence computer communicatively coupled to the CMS of the intelligence server, the intelligence computer including a recommendation user interface (UI) and a notifier UI, and a mobile device communicatively coupled to the CMS, the mobile device configured to receive notifications and recommendations from the intelligence computer that are routed to the mobile device through the CMS.

U.S. Patent Publication No. 20200019626 for Decentralized data management via geographic location-based consensus protocol by inventors Todd, et al., filed Jul. 12, 2018 and published Jan. 16, 2020, is directed to decentralized data management using a geographic location-based consensus protocol in a network of computing resources such as, by way of example, a highly distributed system. For example, at a given consensus node of a consensus network comprising a plurality of consensus nodes configured to participate in a consensus protocol wherein at least a portion of the consensus nodes are mobile, a list is obtained of at least a subset of the plurality of consensus nodes that are predicted to be currently available to participate in the consensus protocol based on geographic location information. A message comprising a transaction to be validated is sent from the given consensus node to the subset of the plurality of consensus nodes in the obtained list. Techniques are also disclosed for adjusting a data protection policy based on the number of computing nodes, some of which are mobile, available to participate.

U.S. Patent Publication No. 20190327180 for Decentralized data management across highly distributed systems by inventors Todd, et al., filed Apr. 23, 2018 and published Oct. 24, 2019, is directed to a system environment including a plurality of computing resources, wherein at least a portion of the computing resources are mobile, a method maintains a decentralized messaging network of interconnected messaging nodes and a decentralized data network of interconnected data nodes. Each of the plurality of computing resources is associated with a given messaging node and a given data node. The method manages transfer of a data set between the plurality of computing resources in association with the decentralized messaging network and the decentralized data network. Managing transfer of the data set comprises inserting a policy file into the decentralized data network specifying one or more policies for managing the transfer of the data set and inserting a message into the decentralized messaging network instructing implementation of the one or more policies.

U.S. Patent Publication No. 20190036764 for Event notification in interconnected content-addressable storage systems by inventors Canessa, et al., filed Jan. 24, 2018 and published Jan. 31, 2019, is directed to a seamless cloud of storage. This storage may be content-addressable storage. An end application may or may not be exposed to the fact that content-addressable storage is used. The publication discloses providing event notification, which may allow applications or users to subscribe to particular events (such as storage of an X-ray by a particular entity). The publication also discloses providing for a shared archive. A shared archive may provide homogeneous access to medical data, etc. that was previously stored into the CAS cloud by heterogeneous applications, varied data types, etc. Additionally, embodiments herein allow for the creation and distribution of virtual packages. For example, a user may create a virtual package for all images related to a patient so that she may have a virtual package of all of her medical data to present to a referring physician.

U.S. Patent Publication No. 20200125604 for System and methods for metadata management in content addressable storage by inventors Canessa, et al., filed Oct. 24, 2019 and published Apr. 23, 2019, is directed to a content addressable storage (CAS) system that allows a user to request, either through an application server or directly to one or more CAS servers, files and content related to a query. The publication discloses that content can be discovered by searching previously-stored metadata related to each file at the content addressable storage server. The search can also be replicated across multiple content addressable storage servers in order to obtain varied results and redundant results. Duplicate results may be flagged or omitted, and the results are returned to the requester.

U.S. Pat. No. 9,880,756 for Successive data fingerprinting for copy accuracy assurance by inventors Mutalik, et al., filed Mar. 10, 2015 and issued Jan. 30, 2018, is directed to systems and methods for checking the data integrity of a data object copied between storage pools in a storage system by comparing data fingerprints of data objects, by scheduling a series of successive copy operations over time for copying a data object from a source data store to a target data store; generating a partial fingerprint of the data object at the source data store using a data fingerprinting operation that creates a fingerprint from a subset of data of the data object; sending the partial fingerprint of the data object to the target data store; sending any new data contents for the data object to the target data store; and creating a partial fingerprint of the data object at the target data store and comparing it to the partial fingerprint sent to the target data store to determine if they differ.

U.S. Pat. No. 9,904,603 for Successive data fingerprinting for copy accuracy assurance by inventors Mutalik, et al., filed Nov. 18, 2014 and issued Feb. 27, 2018, is directed to systems and methods for checking data integrity of a data object copied between storage pools in a storage system by comparing data samples copied from data objects. A series of successive copy operations are scheduled over time for copying a data object from a source data store to a target data store. A first data sample is generated based on a sampling scheme comprising an offset and a period. A second data sample is generated using a similar sampling scheme. The blocks of data in the first data sample and the second data sample are compared to determine if they differ to thereby indicate that the data object at the target store differs from the corresponding data object at the source data store.

SUMMARY OF THE INVENTION

The present invention relates to edge computing, and more specifically to systems and methods for a federated tactical edge cloud.

It is an object of this invention to provide a federated tactical edge cloud utilizing serverless computing, blockchain, content addressing, conflict-free replicated data types, and notarization or authentication of data blocks to provide data authentication and integrity. The federated tactical edge cloud is operable to access and process data from a plurality of sensors and/or a plurality of edge devices.

In one embodiment, the present invention provides a method of providing a federated tactical edge cloud including providing a network including at least one node, wherein each of the at least one node is connected to at least one other node, and wherein the network further includes at least one device, at least one radio, at least one computer, and/or at least one server, a first node of the at least one node generating at least one new data block populated with data and signing the data with a signature, wherein the signature is appended to the at least one new data block, hashing the data using an algorithm, thereby creating a hash of the data, signing the hash of the data using an encoded digital signature and appending the encoded digital signature to the at least one new data block, sending a signature request to a randomly selected set of peer nodes of the at least one node including the hash of the data, each of the randomly selected set of peer nodes extracting the hash of the data and signing the hash of the data using a peer encoded digital signature, thereby creating a peer signed hash of the data, validating the peer encoded digital signature and appending the peer encoded digital signature to the at least one new data block for each of the randomly selected set of peer nodes, generating a block identification by hashing the at least one new data block with the peer encoded digital signature from each of the randomly selected set of peer nodes, and gossiping existence of the at least one new data block to adjacent nodes.

In another embodiment, the present invention provides a method of providing a federated tactical edge cloud including providing a network including at least one node and at least one sensor, wherein each of the at least one node is connected to at least one other node, and wherein the network further includes at least one device, at least one radio, at least one computer, and/or at least one server, a first node of the at least one node generating at least one new data block populated with data and signing the data with a signature, wherein the signature is appended to the at least one new data block, hashing the data using an algorithm, thereby creating a hash of the data, signing the hash of the data using an encoded digital signature and appending the encoded digital signature to the at least one new data block, sending a signature request to a randomly selected set of peer nodes of the at least one node including the hash of the data, each of the randomly selected set of peer nodes extracting the hash of the data and signing the hash of the data using a peer encoded digital signature, thereby creating a peer signed hash of the data, validating the peer encoded digital signature and appending the peer encoded digital signature to the at least one new data block for each of the randomly selected set of peer nodes, generating a block identification by hashing the at least one new data block with the peer encoded digital signature from each of the randomly selected set of peer nodes, and gossiping existence of the at least one new data block to adjacent nodes, wherein communication between nodes is encrypted using public key cryptography.

In yet another embodiment, the present invention provides a system for providing a federated tactical edge cloud including a network including at least one node, wherein each of the at least one node is connected to at least one other node, and wherein the network further includes at least one device, at least one radio, at least one computer, and/or at least one server, wherein a first node of the at least one node is operable to generate at least one new data block populated with data and sign the data with a signature, wherein the signature is appended to the at least one new data block, wherein the first node is operable to hash the data using an algorithm, thereby creating a hash of the data, wherein the first node is operable to sign the hash of the data using an encoded digital signature and append the encoded digital signature to the at least one new data block, wherein an event handler is operable to send a signature request to a randomly selected set of peer nodes of the at least one node including the hash of the data, wherein each of the randomly selected set of peer nodes is operable to extract the hash of the data and sign the hash of the data using a peer encoded digital signature, thereby creating a peer signed hash of the data, wherein the first node is operable to validate the peer encoded digital signature and append the peer encoded digital signature to the at least one new data block for each of the randomly selected set of peer nodes, wherein the first node is operable to generate a block identification by hashing the at least one new data block with the peer encoded digital signature from each of the randomly selected set of peer nodes, and wherein the event handler is operable to gossip existence of the at least one new data block to adjacent nodes.

These and other aspects of the present invention will become apparent to those skilled in the art after a reading of the following description of the preferred embodiment when considered with the drawings, as they support the claimed invention.

DETAILED DESCRIPTION

Figure 1:
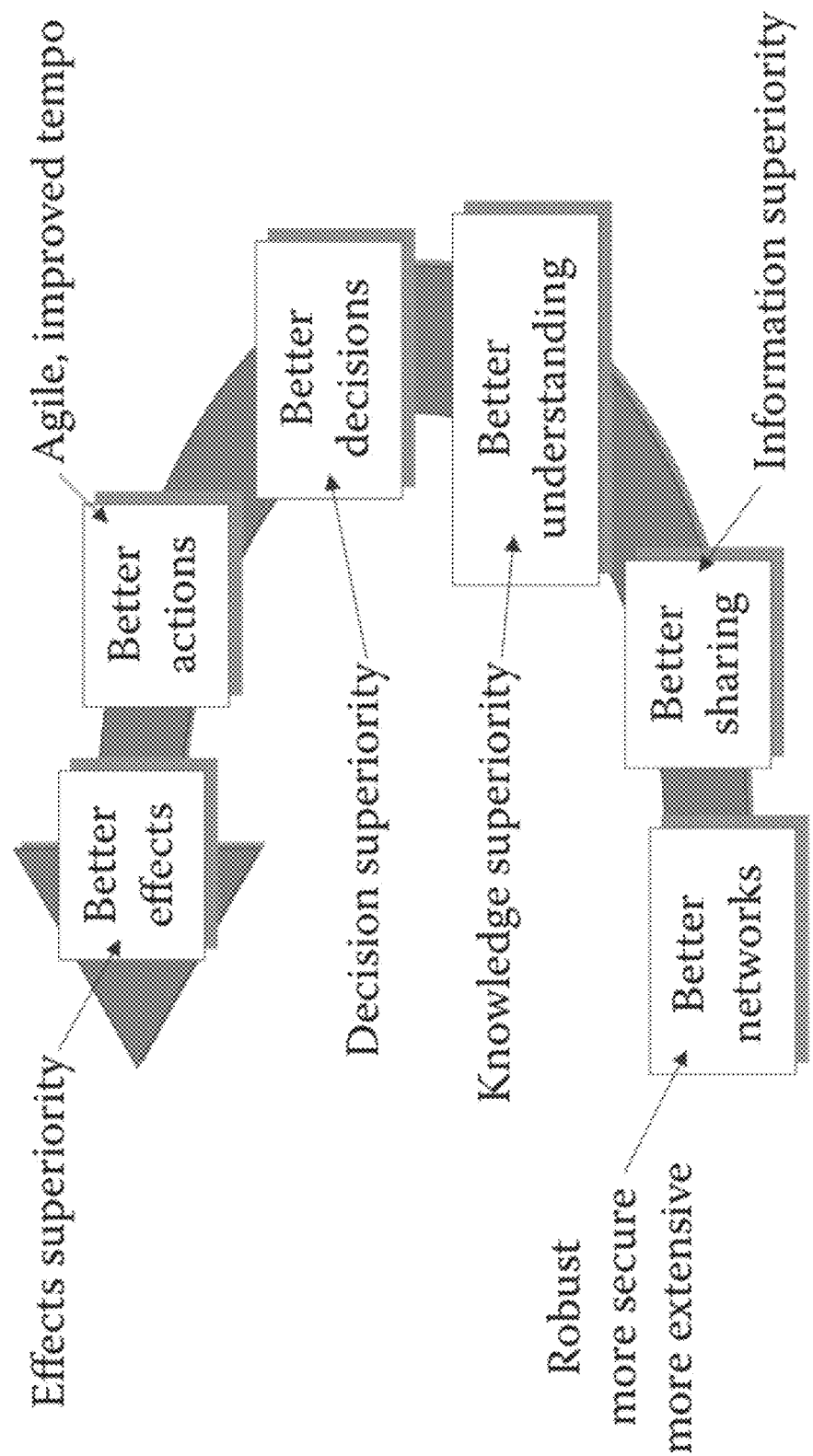
FIG. 1 illustrates information superiority effects.

The present invention relates to edge computing, and more specifically to systems and methods for a federated tactical edge cloud.

In one embodiment, the present invention provides a method of providing a federated tactical edge cloud including providing a network including at least one node, wherein each of the at least one node is connected to at least one other node, and wherein the network further includes at least one device, at least one radio, at least one computer, and/or at least one server, a first node of the at least one node generating at least one new data block populated with data and signing the data with a signature, wherein the signature is appended to the at least one new data block, hashing the data using an algorithm, thereby creating a hash of the data, signing the hash of the data using an encoded digital signature and appending the encoded digital signature to the at least one new data block, sending a signature request to a randomly selected set of peer nodes of the at least one node including the hash of the data, each of the randomly selected set of peer nodes extracting the hash of the data and signing the hash of the data using a peer encoded digital signature, thereby creating a peer signed hash of the data, validating the peer encoded digital signature and appending the peer encoded digital signature to the at least one new data block for each of the randomly selected set of peer nodes, generating a block identification by hashing the at least one new data block with the peer encoded digital signature from each of the randomly selected set of peer nodes, and gossiping existence of the at least one new data block to adjacent nodes. In one embodiment, the method further includes collecting data from at least one sensor. In one embodiment, the at least one sensor includes a Global Positioning System (GPS) device, an accelerometer, a light sensor, a microphone, a thermometer, a clock, a compass, at least one range sensor, at least one laser rangefinder, at least one ballistic solver, at least one elevation sensor, at least one altitude sensor, at least one camera, at least one physiological sensor, at least one environmental sensor, and/or a firearm status sensor. In one embodiment, one or more of the at least one sensor is incorporated in the at least one device. In one embodiment, the at least one node is in wired and/or wireless communication with the at least one computer and/or the at least one server. In one embodiment, the method further includes one or more of the adjacent nodes requesting the at least one new data block from the first node. In one embodiment, the method further includes one or more of the adjacent nodes gossiping existence of the at least one new data block to at least one additional node. In one embodiment, the at least one new data block includes metadata, and wherein the metadata includes node information, at least one link to another data block, and/or a number of cryptographic signatures and node identities. In one embodiment, the at least one new data block includes a parent block and at least one child block. In one embodiment, the method further includes encrypting communication between nodes using public key cryptography. In one embodiment, one or more of the adjacent nodes is operable to purge at least one data block to store the at least one new data block.

In another embodiment, the present invention provides a method of providing a federated tactical edge cloud including providing a network including at least one node and at least one sensor, wherein each of the at least one node is connected to at least one other node, and wherein the network further includes at least one device, at least one radio, at least one computer, and/or at least one server, a first node of the at least one node generating at least one new data block populated with data and signing the data with a signature, wherein the signature is appended to the at least one new data block, hashing the data using an algorithm, thereby creating a hash of the data, signing the hash of the data using an encoded digital signature and appending the encoded digital signature to the at least one new data block, sending a signature request to a randomly selected set of peer nodes of the at least one node including the hash of the data, each of the randomly selected set of peer nodes extracting the hash of the data and signing the hash of the data using a peer encoded digital signature, thereby creating a peer signed hash of the data, validating the peer encoded digital signature and appending the peer encoded digital signature to the at least one new data block for each of the randomly selected set of peer nodes, generating a block identification by hashing the at least one new data block with the peer encoded digital signature from each of the randomly selected set of peer nodes, and gossiping existence of the at least one new data block to adjacent nodes, wherein communication between nodes is encrypted using public key cryptography.

In yet another embodiment, the present invention provides a system for providing a federated tactical edge cloud including a network including at least one node, wherein each of the at least one node is connected to at least one other node, and wherein the network further includes at least one device, at least one radio, at least one computer, and/or at least one server, wherein a first node of the at least one node is operable to generate at least one new data block populated with data and sign the data with a signature, wherein the signature is appended to the at least one new data block, wherein the first node is operable to hash the data using an algorithm, thereby creating a hash of the data, wherein the first node is operable to sign the hash of the data using an encoded digital signature and append the encoded digital signature to the at least one new data block, wherein an event handler is operable to send a signature request to a randomly selected set of peer nodes of the at least one node including the hash of the data, wherein each of the randomly selected set of peer nodes is operable to extract the hash of the data and sign the hash of the data using a peer encoded digital signature, thereby creating a peer signed hash of the data, wherein the first node is operable to validate the peer encoded digital signature and append the peer encoded digital signature to the at least one new data block for each of the randomly selected set of peer nodes, wherein the first node is operable to generate a block identification by hashing the at least one new data block with the peer encoded digital signature from each of the randomly selected set of peer nodes, and wherein the event handler is operable to gossip existence of the at least one new data block to adjacent nodes. In one embodiment, the network further includes at least one sensor. In one embodiment, the at least one sensor includes a Global Positioning System (GPS) device, an accelerometer, a light sensor, a microphone, a thermometer, a clock, a compass, at least one range sensor, at least one laser rangefinder, at least one ballistic solver, at least one elevation sensor, at least one altitude sensor, at least one camera, at least one physiological sensor, at least one environmental sensor, and/or a firearm status sensor. In one embodiment, one or more of the at least one sensor is incorporated in the at least one device. In one embodiment, the at least one node is in wired and/or wireless communication with the at least one computer and/or the at least one server. In one embodiment, the peer encoded digital signature is validated using a public key from each of the randomly selected set of peer nodes. In one embodiment, the at least one new data block includes a parent block and at least one child block. In one embodiment, communication between nodes is encrypted using public key cryptography.

Additional information regarding edge computing systems is available in U.S. application Ser. No. 16/809,181, filed Mar. 4, 2020, U.S. application Ser. No. 16/831,047, filed Mar. 26, 2020, U.S. application Ser. No. 16/831,069, filed Mar. 26, 2020, U.S. Provisional Application No. 62/813,839, filed Mar. 5, 2019, U.S. Provisional Application No. 62/838,666, filed Apr. 25, 2019, U.S. Provisional Application No. 62/838,733, filed Apr. 25, 2019, and U.S. Provisional Application No. 62/930,282, filed Nov. 4, 2019, each of which is incorporated herein by reference in its entirety.

Additional information regarding content addressable storage and/or data integrity is available in U.S. Patent Publication No. 20190036764, U.S. Patent Publication No. 20200125604, U.S. Pat. Nos. 9,880,756, and 9,904,603, each of which is incorporated herein by reference in its entirety.

Referring now to the drawings in general, the illustrations are for the purpose of describing one or more preferred embodiments of the invention and are not intended to limit the invention thereto.

In the early 2000s, the concept of network-centric warfare transformed traditional command structures, enabling sharing of data between both legacy and new assets, with the goal of creating full-spectrum dominance through information superiority as shown in FIG. 1. The proliferation of sensors, unmanned vehicles, command posts, and mobile-enabled ground troops has resulted in a battle space that is increasingly complex and technologically sophisticated.

In the private sector, cloud computing has enjoyed widespread and rapid adoption as organizations attempt to create sustainable competitive advantages through the use of software and data processing. Cloud computing provides a means to achieve a competitive advantage by delivering a more agile information technology infrastructure at a reduced cost.

However, many government organizations remain slow to adopt cloud technology, especially the military. This is due, in part, to the centralized and outsourced nature of public clouds like AMAZON WEB SERVICES and MICROSOFT AZURE. It is also due to the infeasibility of applying cloud computing to all deployment scenarios, including the tactical edge. Namely, the impermanence and transience of military infrastructure, along with the unreliable nature of battlefield networks, makes it impractical to rely on centralized public cloud services.

More recently, the U.S. Department of Defense (DoD) has begun to explore the use of tactical clouds as a means to extend cloud computing and move information processing closer to the individual (e.g., soldiers on the ground). Although tactical clouds cannot address the problems of tactical communications (e.g., low bandwidth, unreliable connectivity), they do enable individuals to operate more autonomously by localizing computation and data storage. Further, the presence of tactical cloud computing can extend the capabilities of individuals, who have ever increasing computational resources (e.g., mobile devices) at their disposal to deliver augmented reality, artificial intelligence, and data fusion at the tactical edge.

The tactical edge is defined as "the first tactical mile." See, e.g., F. Dandashi et al., Tactical Edge Characterization Framework—Volume 1: Common Vocabulary for Tactical Environments, MITRE Technical Report, November 2007, which is incorporated herein by reference in its entirety. Therefore, users at the tactical edge are individuals (e.g., soldiers) "directly involved in executing the mission at the 'tip of the spear'." Id. The tactical edge includes technological constraints related to limited bandwidth, unreliable communications, and limited available storage.

A centralized cloud provides access to a pool of computing resources typically located in one or more data centers. If it were possible to access a centralized cloud from anywhere in the world, including from within the tactical environment, there would be little requirement for other types of tactical clouds. See, e.g., Magar, Alan. "Assessing the Use of Tactical Clouds to Enhance Warfighter Effectiveness." (2014), which is incorporated herein by reference in its entirety.

Figure 2:
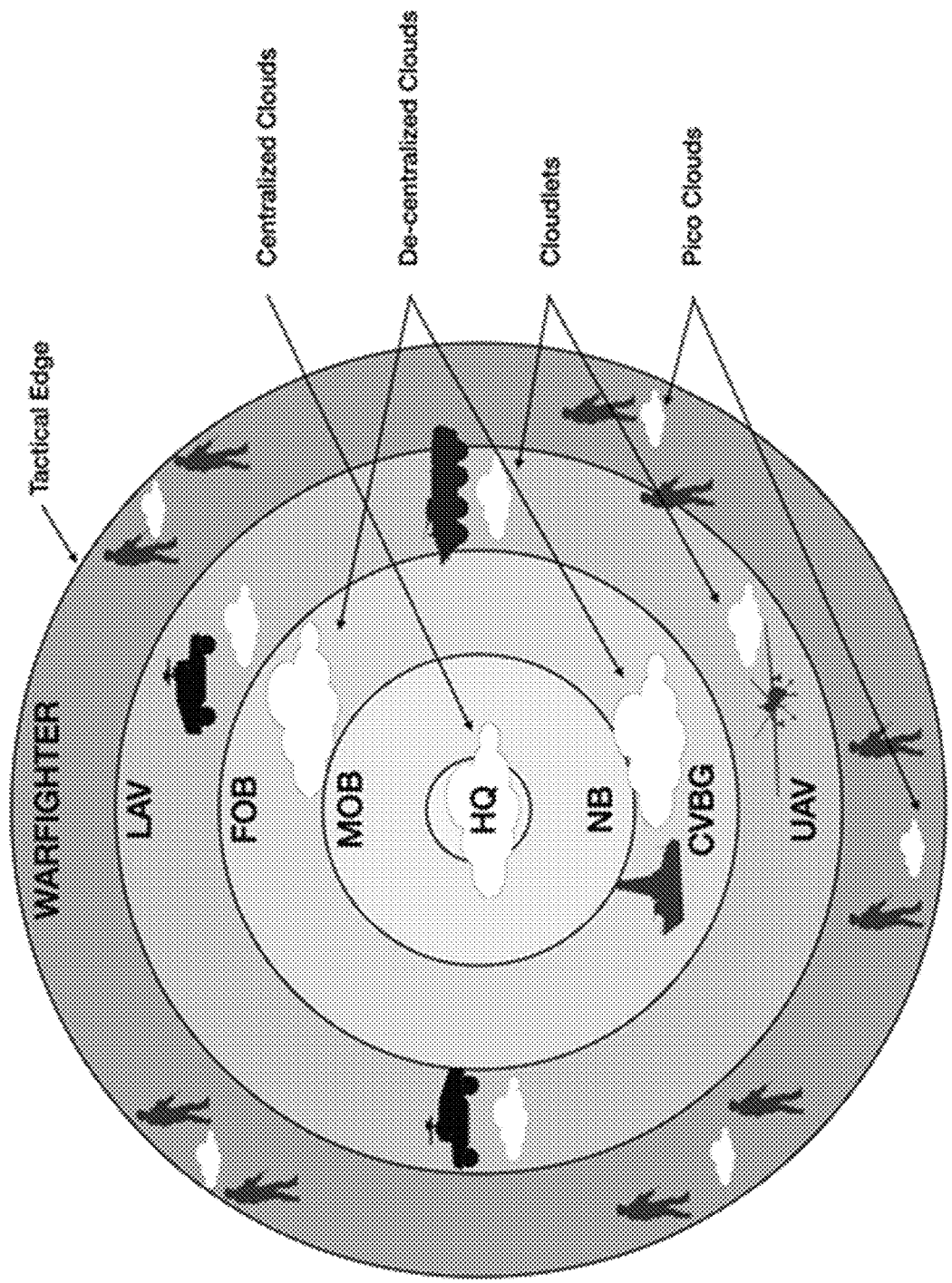
FIG. 2 illustrates tactical clouds.

However, due to the massive amounts of data and the constrained communication links available, centralized clouds are not always readily accessible. Therefore, smaller tactical clouds offering similar services as centralized clouds are required as shown in FIG. 2. These are tactical clouds, and include: (1) decentralized clouds, (2) cloudlets, and (3) pico-clouds.

A decentralized cloud is based on the same technologies as a centralized cloud, but differs in terms of the scale. Decentralized clouds tend to be deployed in geographically remote parts of the world where communication with the centralized cloud is problematic.

While a cloudlet is also based on the same technology as a centralized cloud, it is orders of magnitude smaller. A cloudlet is sometimes referred to as a "data center in a box". Cloudlet resources are typically used by mobile devices which are in close geographic proximity to the cloudlets in order to off-load resource-intensive computations from the mobile devices.

A pico-cloud is the name given to an extremely limited cloud capability provided using resource-constrained devices such as mobile devices. While a pico-cloud is based on the same concepts as a cloudlet, it typically has three orders of magnitude less computational resources available.

Current networking and storage technologies are ill-suited for data sharing in emerging military and first-responder networks where fixed infrastructures and stable connectivity cannot be assumed. The emerging requirements for next generation mobile applications for military and first-responder networks include the following: (1) near real-time computation, (2) fusing multiple data sources, and (3) data integrity and trust.

The concept of having an individual (e.g., soldier) disconnected throughout a mission, occasionally contacting analysts for updates, is no longer acceptable. The next generation of augmented reality, translation, and other applications require fusion of multiple data streams from multiple sensors. As a result, in order to support tactical operations, fusion algorithms must be operable to run in near-real time and be specific to a user's situation. Thus, small-scale fusion applications that are adaptable to a user's situation are preferable over large-scale fusion algorithms. See, e.g., Hall, David. *Distributed Data Fusion for Network-Centric Operations*. 1st ed., Routledge, 2017, which is incorporated herein by reference in its entirety.

The present invention provides for fusing multiple data streams in near-real time to increase the capabilities of individuals at the tactical edge. The present invention accordingly increases the usefulness of sensors and other connected devices at the tactical edge by providing improved connectivity for the sensors and other connected devices as well as near real-time integration of data from the sensors and other connected devices. The multiple data streams include, but are not limited to, data (e.g., sensor data), images, video, sound (e.g., voice), and/or text messages. The fusion algorithms of the present invention are operable to process structured, semi-structured, and unstructured data from the multiple data streams to address the volume, complexity, and types of data resulting from the widespread use of different types of sensors and connected devices. Processing different types of data in real time and/or near-real time supports situational awareness for individuals at the tactical edge. Additionally, the fusion algorithms of the present invention are operable to discover new data sources rather than rely on predetermined data sources. Without the ability to discover new sources, fusion algorithms, such as those in the prior art, may miss data sources necessary to make informed decisions.

Further, fusion algorithms of the present invention address the issues of data integrity and trust. The fusion algorithms of the present invention are operable to evaluate issues related to using soft data sources, applying data to problems not originally contemplated when data was collected, and/or possibly introducing data from misleading sources (e.g., by accident or on purpose). This is particularly important as more users and/or data sources are added.

Individuals (e.g., soldiers, first responders, medical personnel, security personnel, professional athletes, civilians) often carry a mobile device (e.g., smartphone, tablet) that is operable to collect data from sensors including, but not limited to, a Global Positioning System (GPS) device, an accelerometer, a light sensor, a microphone, a thermometer, a clock, a compass, and/or a camera. In one embodiment, one or more of the sensors is incorporated in the mobile device. Further, in one embodiment, the individuals wear and/or carry additional sensors including, but not limited to at least one physiological sensor, at least one environmental sensor, and/or a firearm status sensor (e.g., for soldiers, police officers, armed security personnel, etc.). The at least one physiological sensor includes, but is not limited to, a heart rate sensor, a blood pressure sensor, a skin temperature sensor, a galvanic skin response sensor, a sweat sensor, an analyte sensor, a respiration sensor (e.g., Piezo-Electric Respiratory Effort Belt, Respiratory Inductance Plethysmography band, optical sensor), and/or a pulse oximeter. The at least one environmental sensor includes, but is not limited to, a radiation sensor, a chemical sensor (e.g., airborne chemicals), a pressure sensor, a temperature sensor, a humidity sensor, and/or an odor sensor (e.g., blood, urine, feces, body odor). In one embodiment, one or more of the at least one environmental sensor is incorporated in the mobile device. In one embodiment, the odor sensor utilizes body odor as a biometric identifier to identify at least one person. In one embodiment, the firearm status sensor includes a 3-axis telemetry sensor and/or a holster sensor. In another embodiment, the firearm status sensor is operable to identify an individual who discharged a firearm. Examples of firearm status sensors are disclosed in U.S. Pat. Nos. 9,400,150, 9,404,698, and 9,395,132 and U.S. Publication Nos. 20160169603, 20160173832, 20170074617, and 20170160041, each of which is incorporated herein by reference in its entirety.

The sensors in communication with the mobile device, as well as the at least one physiological sensor, the at least one environmental sensor, and/or the firearm status sensor generate a large amount data. In many cases, it is not energy efficient to transfer the large amount of data from the mobile device and/or additional sensors (e.g., due to low bandwidth, unreliable communication links). As a result, data is often stored on the mobile device and/or the additional sensors, often as unprocessed data, until a later point in time where it is operable to be transferred without interfering with energy usage of the mobile device and/or the additional sensors. However, this delay between data generation and data processing can lead to a significant negative impact on the overall success of a mission.

Accordingly, the DoD began exploring new technologies to deliver cloud-like service at the tactical edge. The Defense Advanced Research Projects Agency (DARPA) conducted various research on the possibility to exploit the peer-to-peer (P2P) networks due their robustness. A peer-to-peer (P2P) network is decentralized and distributed network architecture in which each node acts as both consumer and supplier of resources. In P2P networks, every task is shared amongst multiple interconnected peers who each make a portion of their resources directly available to other network participants. Thus, the principal advantage is that peers do it without the control of a centralized entity.

The Phase 2 ENCODERS Final Report, SRI International, Jun. 8, 2016, which is incorporated herein by reference in its entirety, addresses the objectives of the CBMEN program: "[t]he objective of the DARPA's Content-Based Mobile Edge Networking (CBMEN) program is to develop the network services and transport architectures to enable efficient, transparent distribution of content in mobile ad hoc networking (MANET) environments. CBMEN envisions application-independent and network-agnostic content-distribution services that will be utilized by battlefield applications to efficiently distribute content. The goal is to reduce latency and increase the effective throughput of content for warfighters at the tactical edge, which will significantly enhance the tactical effectiveness of the warfighter by providing the information he needs when he needs it. In addition, information should be provided only to those warfighters with authorized access, and the information should be delivered so that the receiver can verify the integrity and originator of the content (non-repudiation)." Id.

SRI International (SRI) was selected by DARPA as a Technology Developer on the CBMEN Program (DARPA-BAA-11-51) for the following two technology development tasks identified in the CBMEN BAA: (1) Task 3: Managing Distributed Content on a MANET system and (2) Task 4: Securing Content while Maintaining Accessibility.

SRI implemented CBMEN functionality in a two-phase project called ENCODERS (Edge Networking with Content-Oriented Declarative Enhanced Routing and Storage). DARPA successfully field-tested CBMEN software loaded on Android-based smartphones and Army Rifleman Radios at Fort A.P. Hill, Va., marking the completion of Phase 1 of the program.

Figure 3:
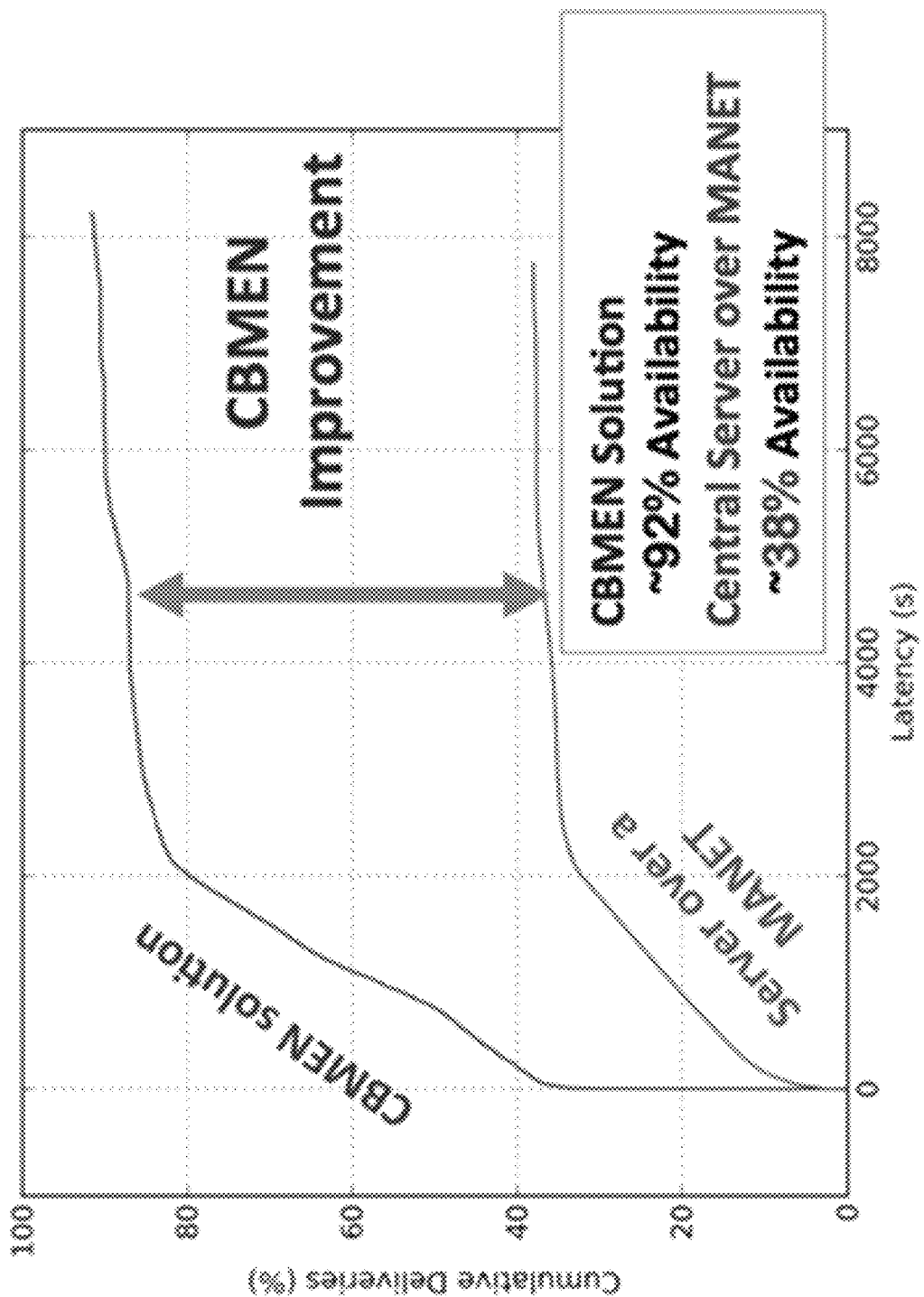
FIG. 3 illustrates a chart showing Content-Based Mobile Edge Networking (CBMEN) Performance Improvement.
Figure 4:
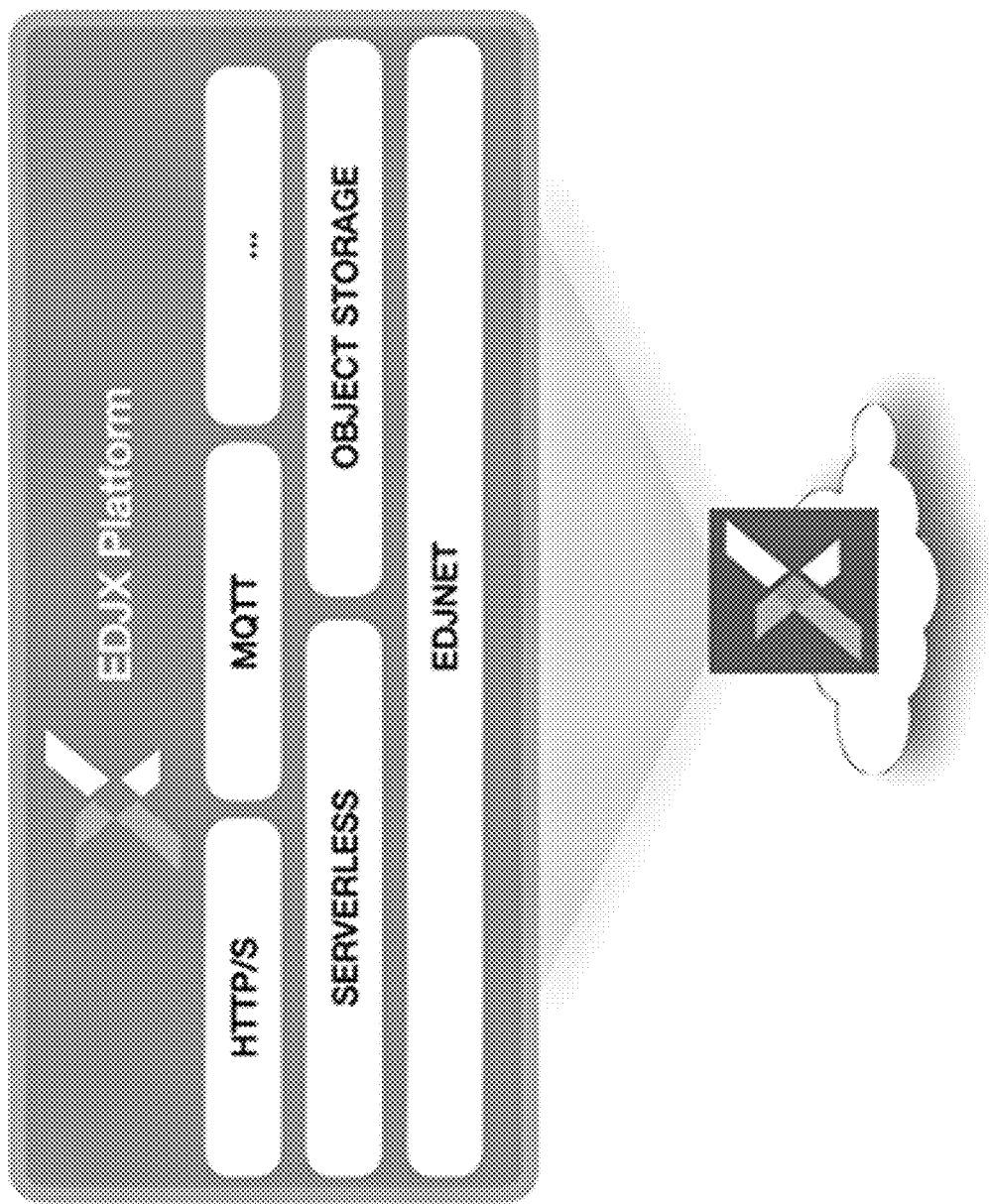
FIG. 4 illustrates an example of an edge computing node.
Figure 5:
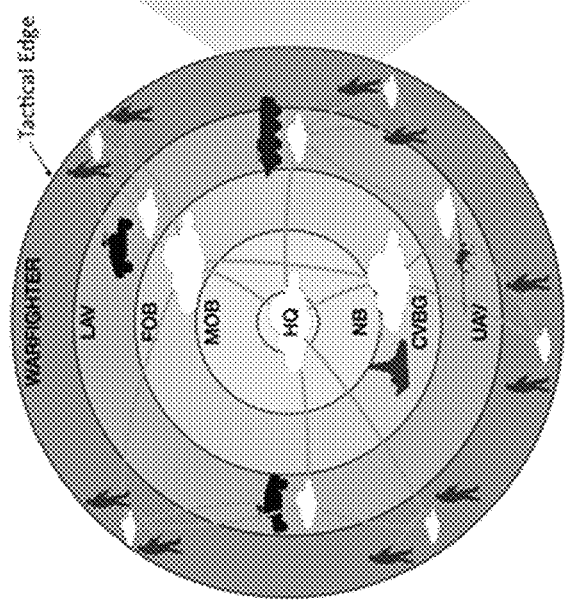
FIG. 5 illustrates an example of a federated tactical data cloud.
Figure 5:
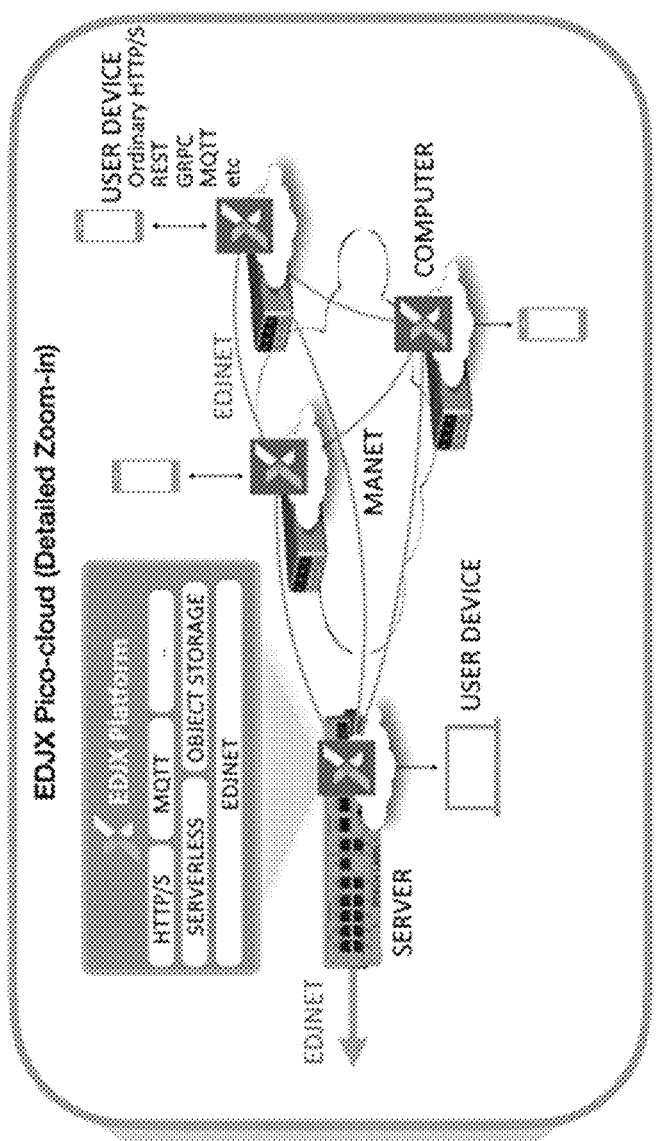

As shown in FIG. 3, Phase 2 of the program concluded in June of 2016, and successfully demonstrated improved warfighting mission support in a complex joint-content sharing environment between United States Marine Corps and Army networks using both military radios and commercial smartphone Wi-Fi capabilities on (i) ground-based platoon-level operation with 30-50 nodes and (ii) airborne-ground network with satellite communication.

Currently, DARPA research on tactical edge technology continues in the Secure Handhelds on Assured Resilient networks at the Tactical Edge (SHARE) program and the related Network Universal Persistence (Network UP) program with FY 2020-2024 research expenditures forecast in the range of $840M. See, e.g., Department of Defense Fiscal Year (FY) 2020 Budget Estimates, Mar. 1, 2019, which is incorporated herein by reference in its entirety.

Rapid changes in information technology have enabled mobile information architectures, changing the concept of where and how software will be employed in the battlefield. However, the implementation of cloud architectures is inherently problematic in the mobile ad-hoc network environments of the military.

Innovative programs such as CBMEN, SHARE, and Network UP have demonstrated the feasibility of new technologies such as cloudlets and peer-to-peer pico clouds, but these prior art implementations have serious technological and operational deficiencies including the following: (1) distributed application development and development, (2) data persistence and exchange, and (3) data integrity and trust.

Distributed computing enables near real-time performance for data processing and data fusion algorithms. However, the development of distributed applications is severely complicated by infrastructure dependencies. As previously discussed, de-centralized clouds and cloudlets are built using the same virtualization, networking, orchestration, and storage technologies of centralized clouds. These technologies pre-suppose the existence of static infrastructure resources, a fundamental assumption that does not easily adapt to ad-hoc mobile military infrastructure. New technology such as CBMEN improves upon the conditions of providing ad-hoc cloud services in pico-cloud environments, but still requires extensive design and refactoring of applications to work within the constraints of these architectures. Consequently, the process of deploying new applications to the battlefield is error complex, error prone, and extremely slow, resulting in undesirable delays for delivering incremental improvements and innovations to battlefield software, algorithms, and data fusion capabilities.

The present invention increases the capabilities of the individuals (e.g., soldiers) at the tactical edge by fusing data from a growing plurality of sensors and connected devices. As discussed herein, tactical cloud architectures use the same data storage architectures as centralized clouds, and the transmission of data from one point to another on the network relies upon the Internet's location-based addressing schemes. Therefore, tactical clouds are islands or silos of data. Like data on mobile devices themselves, data on tactical clouds is often stranded and therefore inaccessible in near-real time, or is dependent on strictly hierarchical translation layers that convey data to higher tiers of the infrastructure, and ultimately back to centralized clouds.

The centralization of trust assumption in prior art tactical clouds is problematic due to the potential introduction of accidentally or purposefully misleading data, or the use of data beyond its originally intended scope. The assumptions are that data within a repository is trusted, valid, and unmodified are merely supported by mutual authentication. Accordingly, the integrity of data in a repository is not guaranteed.

A storage device may be location-addressed or content-addressed. In location-addressed storage systems, a unit of data is identified by a Uniform Resource Identifier (URI). In one embodiment, the URI includes the DNS network name or internet protocol (IP) address of the storage device, as well as the location of the data on the storage device. This provides for resources being stored in a manner that is centralized on a server or on a set of servers on the Internet; so then the data itself is ultimately controlled by the owner of the server(s).

It is difficult to make guarantees about the durability or the integrity of data. On a centralized infrastructure, like the cloud, this is done by creating multiple replicas of the data across multiple physical servers and locations. Additionally, when resources are centralized, the integrity of the data itself is only as reliable as the infrastructure hosting the resource. When a resource is located by location, there is no inherent guarantee that the resource contains the expected data, or that the data in question has not been tampered with by a third party.

Furthermore, the resource's location may not be optimal for a particular purpose. For example, the resource may be on the set of a remote server that is too latent or without enough bandwidth.

In contrast, in a content-addressed storage (CAS) system, a unit of data is assigned a globally unique identifier which is derived from the content of the unit of data itself, and the unit of data is accessed using this unique identifier. In a decentralized content-addressed storage system, location information is exchanged dynamically between storage devices on a network, permitting autonomous ad-hoc access to the unit of data. For example, the unit of data is provided as the input to a hashing function, the resulting hash of which is used as the content-address of the unit of data.

What is needed is a federated tactical edge cloud using a decentralized platform that provides near real-time computation, fusing of multiple data sources, and data integrity and trust. None of the prior art provides a federated tactical edge cloud including serverless computing, blockchain, content addressing, and conflict-free replicated data types.

The present invention provides a decentralized platform for building and operating distributed applications across a federation of ad-hoc and mobile environments at the far-edge of communication networks. The decentralized platform of the present invention simplifies distributed application development and operations, delivers near real-time performance for data processing and data fusion algorithms, and increases the security and integrity of distributed applications.

The present invention utilizes a distributed edge computing platform (sometimes referred to as "EDJX") to reduce latency and increase network throughput to Hypertext Transfer Protocol (HTTP) clients (edge devices) by locating server nodes in close proximity to edge devices. The edge platform of the present invention is operable to write, test, and deploy low-latency edge applications. The edge platform is further operable to execute serverless functions or otherwise retrieve data from the platform compute nodes located in close proximity to the client. The edge platform is Application Programming Interface (API) compatible with cloud infrastructures including, but not limited to, GOOGLE CLOUD PLATFORM, AMAZON WEB SERVICES (AWS), and MICROSOFT AZURE.

An edge device is any device which provides an entry point into enterprise or service provider core networks. Examples include, but are not limited to, routers, routing switches, integrated access devices (IADs), multiplexers, metropolitan area network (MAN) access devices, wide area network (WAN) access devices, IoT devices, sensors, industrial machines, personal computing devices, laptop computing devices, tablet computing devices, mobile computing devices, cameras, and any other device that produces and/or collects data.

The edge platform of the present invention overcomes current issues in the prior art, including latency and bandwidth limitations at the edge, by deploying serverless functions in close proximity to edge devices. The edge platform further enables edge devices to securely access and record data at the edge using blockchain technologies.

Advantageously, the present invention overcomes the operational deployment limitations of prior art edge clouds by incorporating the following: (1) serverless computing, (2) blockchain, (3) content addressing, and (4) conflict-free replicated data types.

A key aspect of serverless computing is functions. Functions are small, independent pieces of code that complete specific requests, providing developers with more operational flexibility and cost savings when building, deploying, and running applications. Serverless computing, also known as functions-as-a-service (FaaS), is a cloud computing execution model which dynamically manages the allocation of resources on-demand according to events. Serverless functions are instantiated just-in-time to respond to events within an environment (e.g., network requests) or the arrival or modification of data, and typically run to completion and then terminate, returning resources to the system. For building decentralized applications the serverless paradigm is nearly ideal, owing to a lack of infrastructure dependencies and artifacts. Virtualization solutions like virtual machines and containers provide excellent resource isolation, performance, and security. However, virtual machines and containers are managed entities requiring dedicated resources, orchestration, and configuration. As such, they are tightly coupled to the underlying infrastructure. Deploying applications in legacy virtualization systems necessarily means incorporating and accounting for infrastructure artifacts. Typically, this is accomplished through complex orchestration systems such as Kubernetes (open source). In contrast, in pure serverless environments, developers focus on the development of their functions in isolation, without respect to infrastructure, software libraries, or other dependencies. In effect, the system resolves such dependencies on behalf of the software, freeing developers from infrastructure management.

Although the term blockchain refers to a growing list of records, called blocks, which are linked cryptographically, more generally blockchain refers to an entire family of related Distributed Ledger Technologies (DLT) used to create and manage these complex distributed data structures. Namely, the DLT concepts like Merkle trees or hash trees, along with the related concept of a directed acyclic graph (DAG), and a number of new techniques for creating robust peer-to-peer networks, gossip dissemination of data, eventual consistency, and a host of other related concepts and learnings have been incorporated into the design and implementation of the platform. As security is a big concern for edge use cases, each serverless request is preferably validated by and recorded to a blockchain to create an immutable record of execution.

Referring to data by its content, rather than its location, is one of the most powerful concepts to emerge in distributed computing in the last decade. In content-addressed systems, a cryptographic checksum of the data is used as the address for the data, creating a self-validating scheme that assures data integrity. Rather than connecting to a location to request the data, content-addressed networks route the data to the location of the requestor, offloading protocol overhead to ad-hoc infrastructure.

In distributed computing, a conflict-free replicate data type (CRDT) is a data structure that is operable to be replicated across multiple computers, where the replicas are operable to be updated independently and concurrently without coordination between peers.

The platform of the present invention provides a content-addressed data network (sometimes referred to as "EdjNet"), which enables the transparent, opportunistic, and secure dissemination of data between nodes in a peer-to-peer network. The platform includes a peer-to-peer protocol that uses cryptographic identities, delegation of trust, and end-to-end encryption, to create a global namespace for self-validating data that runs transparently over IPv4 and/or IPv6 networks.

Nodes in the distributed edge computing platform (sometimes referred to as "EDJX nodes") are zero-configuration nodes, meaning the nodes are operable to acquire any configuration dynamically and on-the-fly from the ad-hoc environment. Consequently, all nodes are identical from a software stack and configuration point of view, removing the need for orchestration and configuration management.

Every node in the distributed edge computing platform exposes a number of protocol endpoints, based on network policy, to enable proximal cloud services: (1) HTTP and Hypertext Transfer Protocol Secure (HTTPS), (2) Message Queuing Telemetry Transport (MQTT), (3) Object Storage, and (4) Domain Name System (DNS).

HTTP and HTTPS services include, but are not limited to, request routing, rewriting, redirecting, and/or triggering serverless functions. The platform is preferably operable to perform proximity-based routing of HTTP and/or HTTPS requests to the closest content-addressed data network-enabled node. In one embodiment, the proximity-based routing is based on at least one proximity metric including, but not limited to, availability, performance, and/or other criteria. In one embodiment, the platform is operable to create global rewrite rules to transparently rewrite uniform resource identifiers (URIs). In one embodiment, the platform is operable to create global redirect rules to transparently redirect URIs. In one embodiment, the platform is operable to trigger serverless functions based on HTTP request, URI, etc.

MQTT services include, but are not limited to, global messaging and/or triggering serverless functions. In one embodiment, the platform is operable to extend MQTT across multiple geographic regions with no centralized messaging broker. In one embodiment, the platform is operable to trigger serverless functions based on MQTT events.

Object storage services include, but are not limited to, key-value storage, triggering serverless functions, durability, policies, and/or encryption. In one embodiment, the platform is operable to persist data using key-value storage under a single, global namespace over HTTP and HTTPS. In one embodiment, the platform is operable to trigger serverless functions based on creation, deletion, or updates to data objects. The platform preferably is operable to perform transparent and opportunistic replication of data ensuring durability through eventual consistency. In one embodiment, the platform controls access to data based on Identity and Access Management (IAM) policies which dynamically replicate. In one embodiment, the platform includes full end-to-end encryption of data in transit and at rest with optional encryption of payloads based on cryptographic identities tied to IAM policies.

DNS services include, but are not limited to, routing and/or delegating authority. In one embodiment, the platform responds to DNS requests using at least one DNS metric. In one embodiment, the at least one DNS metric includes, but is not limited to, geospatial proximity, performance, and/or availability. The platform is preferably operable to dynamically direct clients to edge nodes. In one embodiment, the platform is operable to delegate DNS authority to the content-addressed data network to disseminate DNS information and routing rules to the global network.

Content-addressed data network nodes coordinate dynamically to deliver cloud services at the far-edge of modern communication networks, across a range of hardware platforms (e.g., IoT, mobile, server, etc.). The content-addressed data network federates a diverse set of physical infrastructures to create a single, global data network, in which data is securely persisted and replicated with assured integrity. Working together, nodes in the distributed edge computing platform deliver cloud services over standard protocols and interfaces.

Advantageously, the present invention provides increased responsiveness, improved agility, simplified operations and increased data integrity. The distributed edge computing platform enables proximal data processing and computation in order to reduce application latencies and increase responsiveness. Building decentralized applications with the distributed edge computing platform of the present invention enables near real-time data fusion and algorithms to work seamlessly across a plurality of connected devices.

Additionally, the distributed edge computing platform of the present invention helps developers build distributed applications at planet-scale. All serverless functions are stored on the content-addressed data network as content-addressed data blocks and are opportunistically disseminated among the plurality of the content-addressed data network nodes. There is no software to deploy or maintain on edge computing nodes. As a result, deploying functions, cache purges, and/or rolling back or forward between versions of serverless functions are nearly instantaneous.

In a preferred embodiment, every node in the distributed edge computing platform is designed for zero-configuration and all nodes are essentially identical. In one embodiment, the distributed edge computing platform dynamically allocates and schedules resources based on individual node capabilities without operator intervention. Advantageously, this allows developers to focus on building critical functionality because there are no infrastructure dependencies or complex orchestration systems to manage.

The content-addressed data network of the present invention provides self-verification through CRDTs together with data notarization technology to increase the integrity of data, preventing the introduction of misleading or erroneous data (whether accidental or deliberate).

Advantageously, nodes are operable to increase the integrity of newly generated data blocks by having peer nodes "witness" the creation of new data blocks before they are disseminated to the gossip network. A new data block is instantiated that contains metadata about the data block and the data itself. The metadata includes node information, links to other data blocks (e.g., to facilitate the creation of complex data structures), and a number of cryptographic signatures and node identities.

A three-phase process begins when a node (e.g., Node 1) generates a new block (or the plurality of blocks that represent the data structure) in which are placed the data. Rather than gossiping the new data block to the network immediately in Phase 1, Node 1 increases the integrity of the data by having peer nodes witness the data block generation event. First, Node 1 randomly selects a configurable number of nodes (i.e., N nodes) from a set of connected peer nodes. A protocol command is sent to each node requesting the signature of the encapsulated data block. In Phase 2, each node responds to Node 1's signature request with an encoded digital signature of the data using its private key. In one embodiment, the encoded digital signature is an elliptic curve digital signature (e.g., Ed25519). Bernstein, D. J., Duif, N., Lange, T. et al. J Cryptogr Eng (2012) 2: 77. https://doi.org/10.1007/s13389-012-0027-1 details the Ed25519 digital signature and is hereby incorporated herein by reference in its entirety.

In Phase 3, Node 1 appends the digital signature from each witness node to the data block, then generates a cryptographic hash of the entire data block (e.g., including metadata, data, signatures, links), which is used as the identity of the block (i.e., content addressing). The block is then gossiped to a configurable number of peer nodes (e.g., N nodes).

Figure 6:
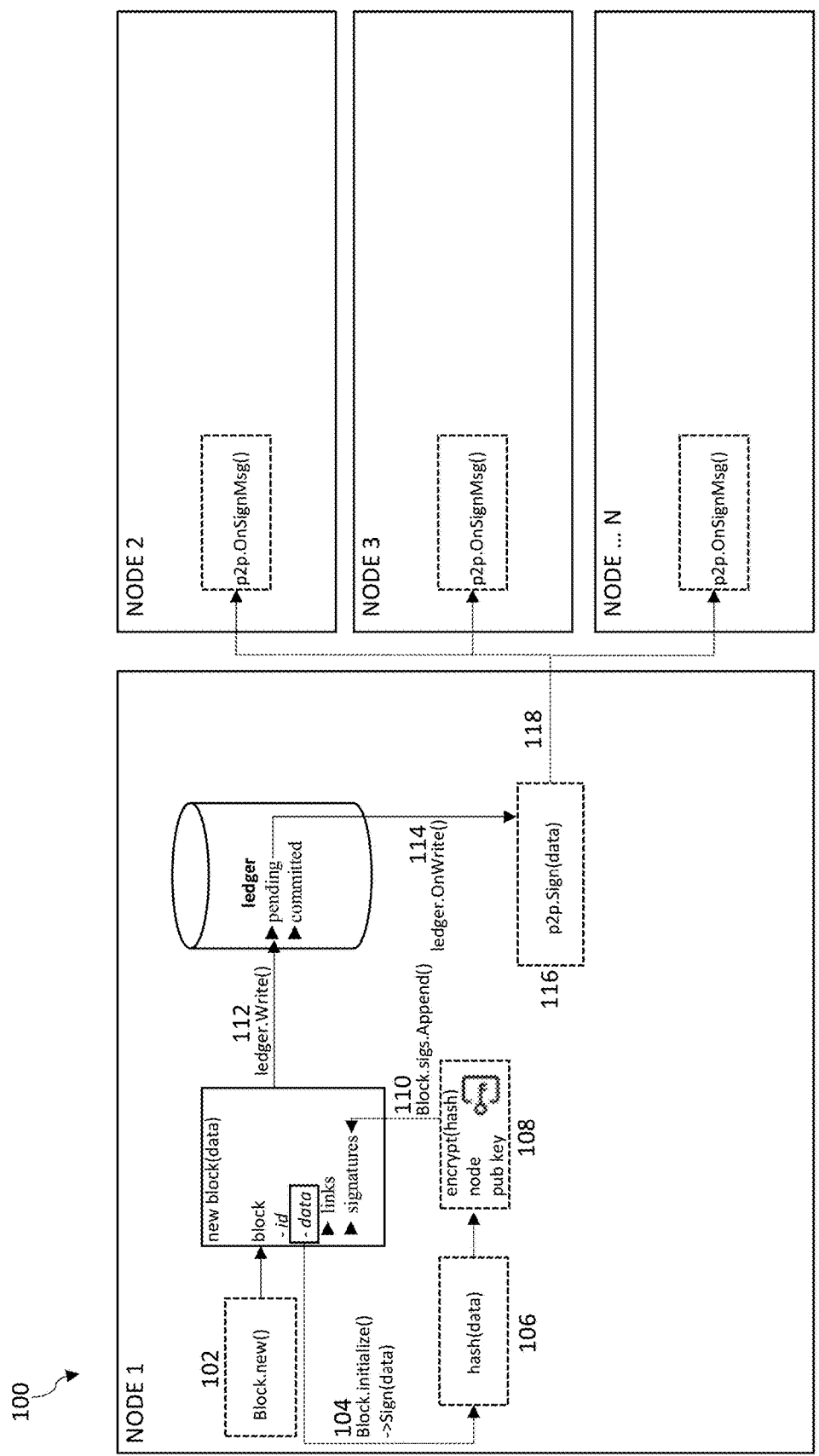
FIG. 6 illustrates one embodiment of Phase 1 of a notarization process.

As previously described, the present invention includes notarization or authentication of data blocks, which results in federated data for data authentication and integrity. As used herein, "notarization" refers to any authentication process provided by the present invention. FIG. 6 illustrates one embodiment of Phase 1 of the notarization process 100. In step 102, Node 1 generates a new data block that is populated with data. In step 104, the data is signed by the generating node (i.e., Node 1) and the signature is appended to the new data block signatures. In step 106, the data is hashed using a user-specified algorithm. In step 108, a hash of the data is signed using an encoded digital signature (e.g., Ed25519). In step 110, the encoded digital signature is appended to the new data block. In step 112, the new data block is written to a local ledger as pending. In step 114, the new data block commit is confirmed to the local ledger. In step 116, writing to the local ledger triggers an event to an event handler. In step 118, the event handler fires a signature request to a randomly selected set of peer nodes.

Figure 7:
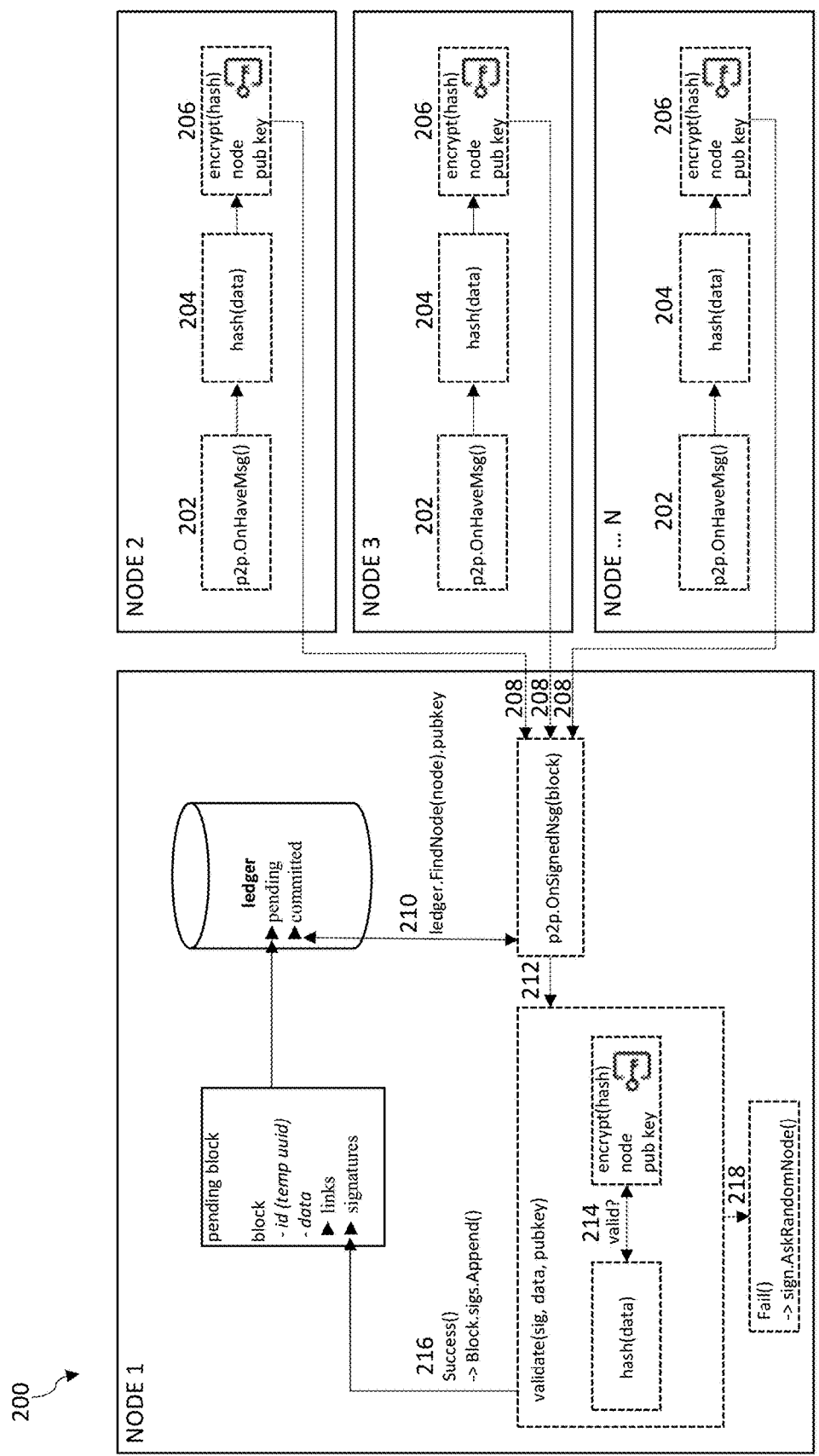
FIG. 7 illustrates one embodiment of Phase 2 of the notarization process.

FIG. 7 illustrates one embodiment of Phase 2 of the notarization process 200. In step 202, a node receives a signature request with a hash of the data. In step 204, the node extracts the hash from the message. In step 206, the node signs the hash using an encoded digital signature (e.g., Ed25519). Alternatively, the node encrypts the hash and encodes. In step 208, the node sends the signature to the event handler. In step 210, the event handler identifies the pending commit and the connection handler. In step 212, the event handler validates the signature using the remote node's public key. In step 214, the node attempts to validate the signature. In step 216, validation of the signature is successful and the signature is appended to the data block. In step 218, validation of the signature is not successful (i.e., fails) and Node 1 attempts to have another node sign or abandons the commit.

Figure 8:
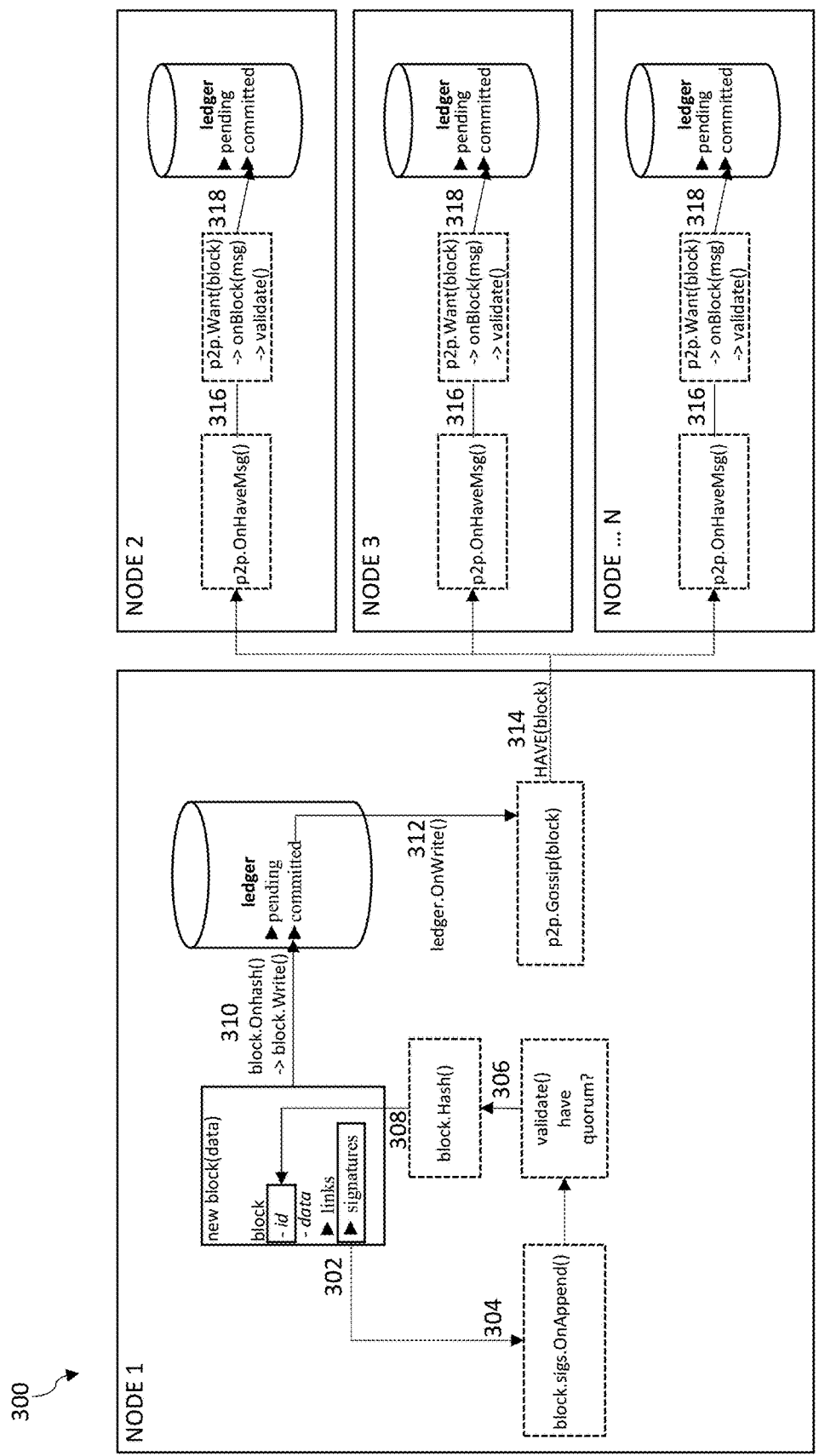
FIG. 8 illustrates one embodiment of Phase 3 of the notarization process.

FIG. 8 illustrates one embodiment of Phase 3 of the notarization process 300. In step 302, an append of the signatures of the block triggers an event. In step 304, the event handler is invoked. In step 306, the requestor determines if it has a quorum. The quorum is a configurable number of nodes (e.g., N nodes). In step 308, if the requestor has a quorum, it hashes the entire block to generate the block id. In step 310, the block update triggers an update event to the ledger where the block is deleted from the pending queue and added to the committed queue. In step 312, the update of the committed ledger triggers an event. In step 314, the event handler gossips the new block to adjacent nodes. In step 316, a node receives a HAVE message and replies with a WANT message with the id of the block. In step 318, the block is transmitted to the requesting node and saved to the committed ledger. This in turn triggers steps 312 and 314 on the requesting node.

The system is operable to break a large file into a plurality of blocks. In one embodiment, each block has a maximum size. In one embodiment, the maximum size is configurable. For example, a 1 MB file is broken into a plurality of 1 kB blocks. In a preferred embodiment, the plurality of blocks includes a parent block with links to all child blocks. Each child block includes an address of the parent block.

Advantageously, the notarized ledger of the present invention requires a digital signature and witness nodes prior to hashing the block. This provides data integrity. A subsequent requestor of the data knows that the correct file is received because it includes the digital signature. Any modification to the data results in a new content identifier. It is therefore impossible to thwart the data integrity of the block because a hacker does not know which connected nodes were used to witness a block because the witness nodes are selected at random. Because of the data integrity provided by the system, it is useful in both real time scenarios and to reconstruct an event.

Figure 9:
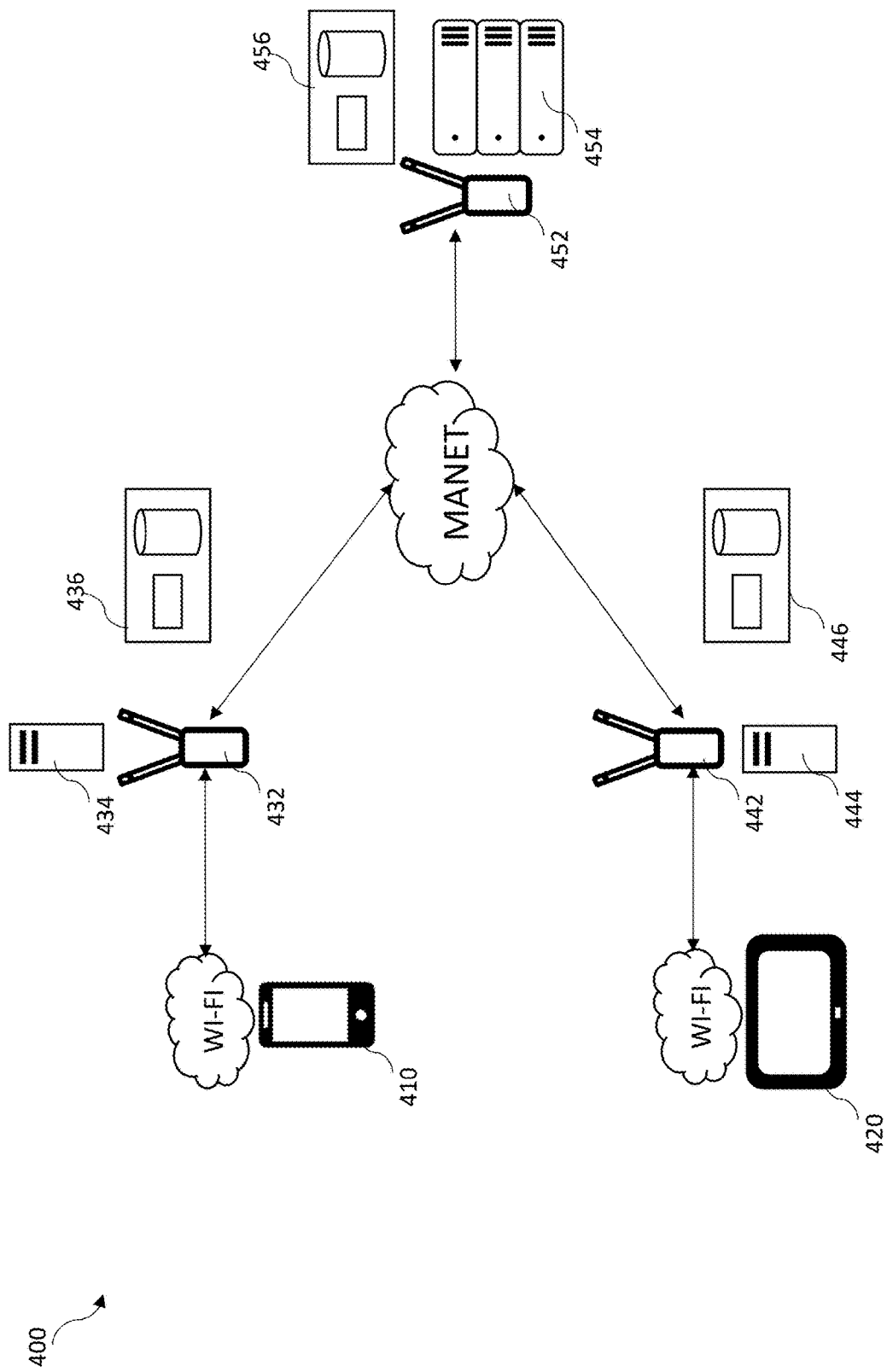
FIG. 9 illustrates an example of a mobile ad hoc network (MANET).

FIG. 9 illustrates an example of a mobile ad hoc network (MANET) 400 (e.g., used by troops). The MANET 400 includes at least one device, at least one radio, at least one computer, at least one node, and/or at least one server. In the example shown in FIG. 9, the MANET 400 includes a first device 410 (e.g., smartphone) and a second device 420 (e.g., tablet). The first device 410 is in network communication (e.g., WI-FI) with a first radio 432, a first computer 434, and/or a first node 436. The second device 420 is in network communication (e.g., WI-FI) with a second radio 442, a second computer 444, and/or a second node 446. The MANET 400 further includes a third radio 452, a server 454, and/or a third node 456. The first radio 432, the second radio 442, and the third radio 452 enable communication between the radio via the MANET 400. Although the MANET 400 is shown with three radios, three nodes, two computers, two devices, and one server, any number of radios, nodes, computers, devices, and/or servers are compatible with the present invention.

In one embodiment, one or more of the at least one computer and/or the at least one server includes an internal transceiver operable to communicate directly within the network, such that a separate radio is not required to communicate on the MANET. In a preferred embodiment, the at least one node is in wired and/or wireless communication with the at least one computer and/or the at least one server.

In a preferred embodiment, each of the at least one device is in communication with at least one sensor. In one embodiment, one or more of the at least one sensor is incorporated into the at least one device. Additionally or alternatively, one or more of the at least one sensor is in wireless and/or wired communication with the at least one device. The at least one sensor includes, but is not limited to, at least one noise sensor (e.g., a ballistic sensor), at least one range sensor, at least one elevation sensor, at least one altitude sensor, at least one camera (e.g., video, static), at least one environmental sensor (e.g., air quality, radiation, airborne chemicals, pressure, temperature, humidity, wind speed), and/or at least one physiological sensor. The at least one noise sensor is preferably operable to detect audible sound (e.g., 20 Hz-20,000 Hz) and/or inaudible sound (e.g., ultrasound). In one embodiment, the at least one physiological sensor includes a heart rate sensor, a blood pressure sensor, a skin temperature sensor, a galvanic skin response sensor, a sweat sensor, an analyte sensor, a respiration sensor, and/or a pulse oximeter.

In one embodiment, the MANET 400 further includes at least one laser rangefinder and/or at least one ballistic solver (not shown). The at least one laser rangefinder and/or the at least one ballistic solver is operable to capture data including, but not limited to, a range of a target, an elevation, an altitude, and/or at least one environmental parameter (e.g., air quality, radiation, airborne chemicals, pressure, temperature, humidity, wind speed). Each of the at least one laser rangefinder and/or the at least one ballistic solver uses the captured data with stored ammunition data to calculate an aiming correction. The aiming correction is preferably delivered to at least one optical system (e.g., disturbed reticle of a digital optic system). The at least one optical system is preferably operable to communicate wirelessly over the MANET 400 and/or via a cabled connection (e.g., to the at least one device). The at least one laser rangefinder and/or the at least one ballistic solver is preferably operable to determine at least one location of at least one shooter. Advantageously, this system reduces operator errors and maintains situational awareness while allowing operators to keep eyes on targets and hands on weapons.

Figure 10:
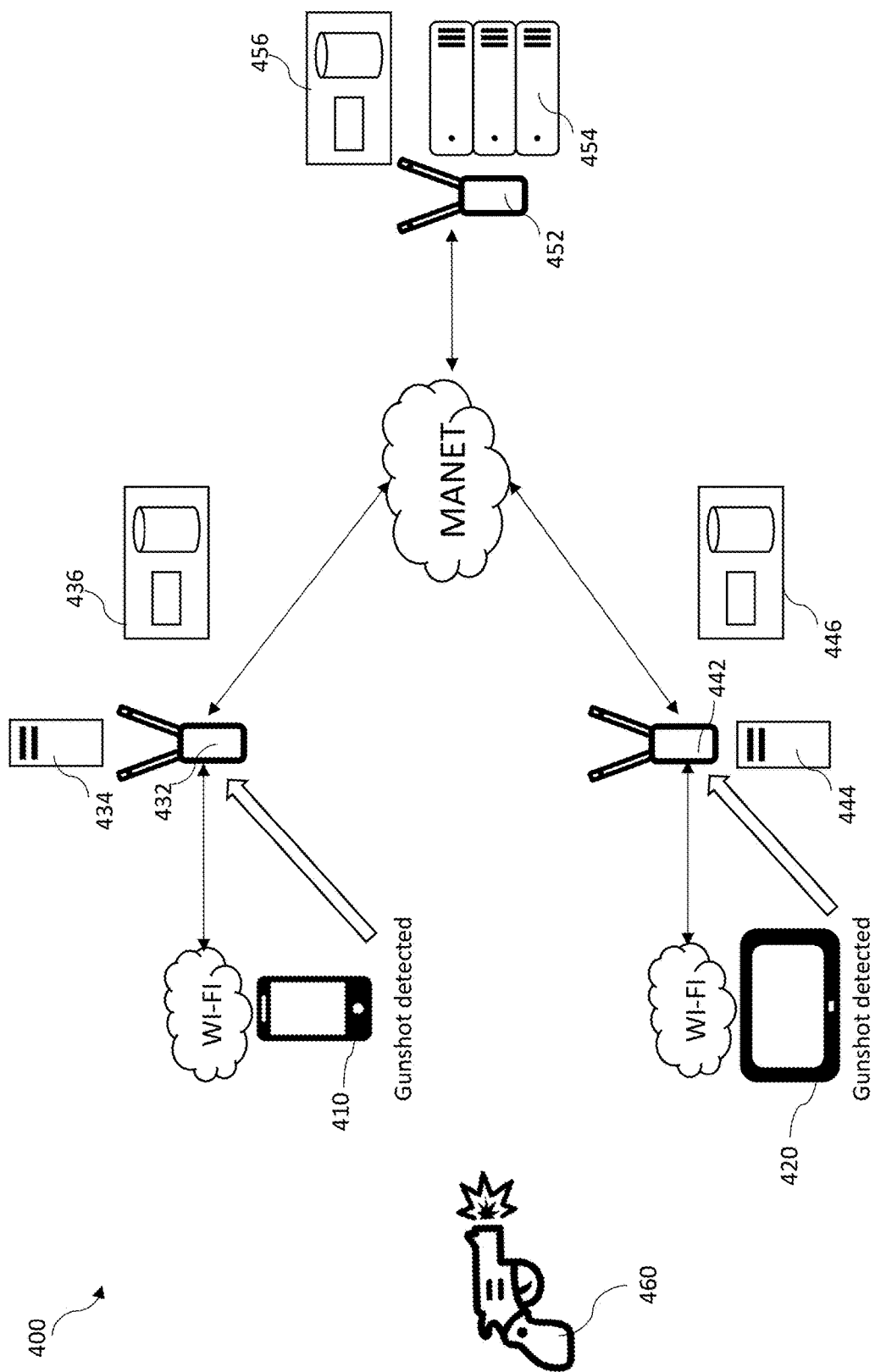
FIG. 10 illustrates the MANET of FIG. 9 with a gunshot detection scenario.

FIG. 10 illustrates the MANET 400 of FIG. 9 with a gunshot detection scenario. The first device 410 and the second device 420 detect a gunshot from a gun 460. The first device 410 sends first device data regarding the gunshot to the first radio 432, the first computer 434, and/or the first node 436. The second device 420 sends second device data regarding the gunshot to the second radio 432, the second computer 444, and/or the second node 446.

Figure 11:
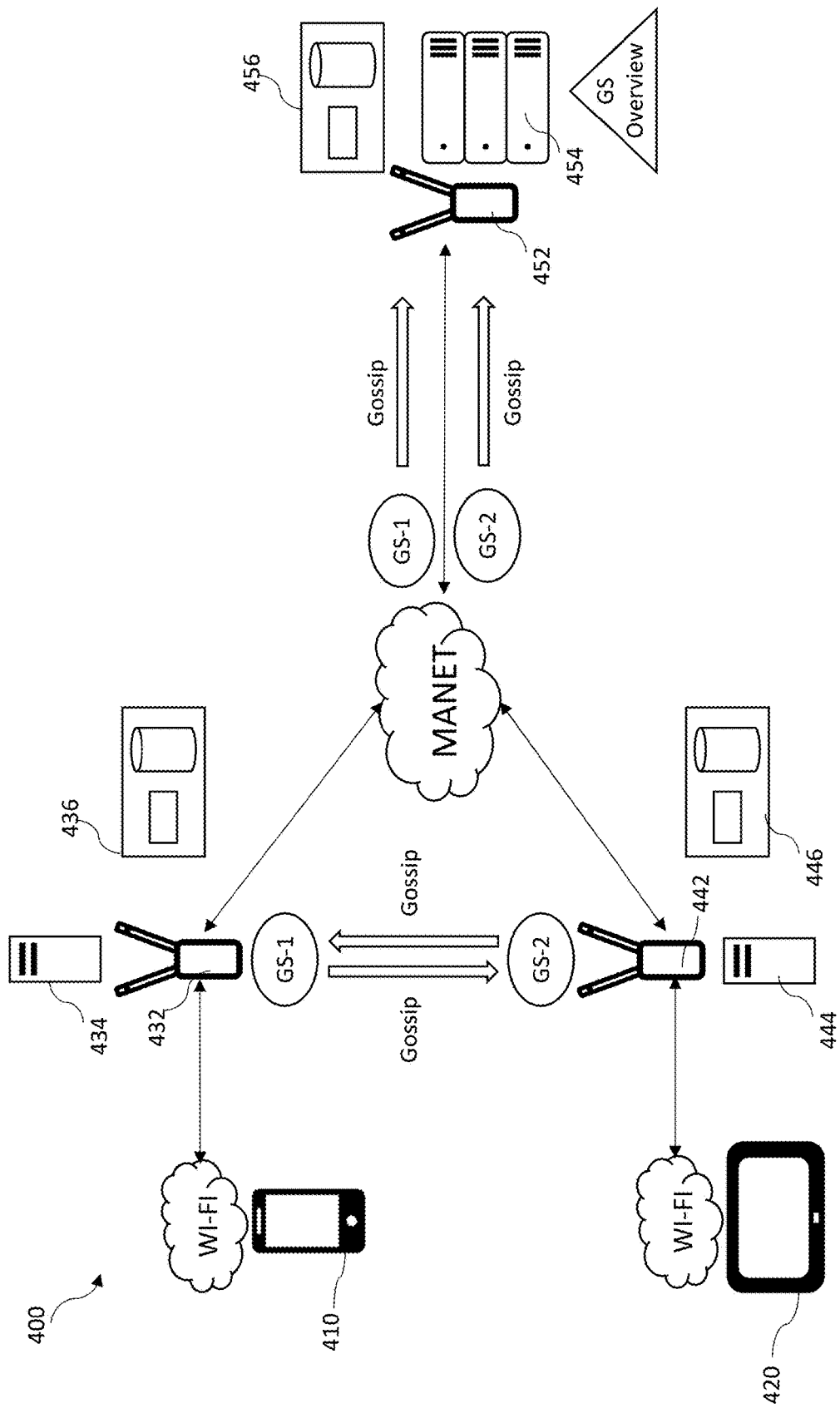
FIG. 11 continues the gunshot detection scenario of FIG. 10.

As shown in FIG. 11, the first computer 434 processes the first device data, thereby creating processed data GS-1. The second computer 444 processes the second device data, thereby creating processed data GS-2. GS-1 is stored in Node 1 436 and GS-2 is stored in Node 2 436. Node 1 436 gossips GS-1 to Node 2 446 and Node 3 456, and Node 2 446 gossips GS-2 to Node 1 436 and Node 3 456. Node 3 456 then processes GS-1 and GS-2, thereby creating GS Overview data.

Figure 12:
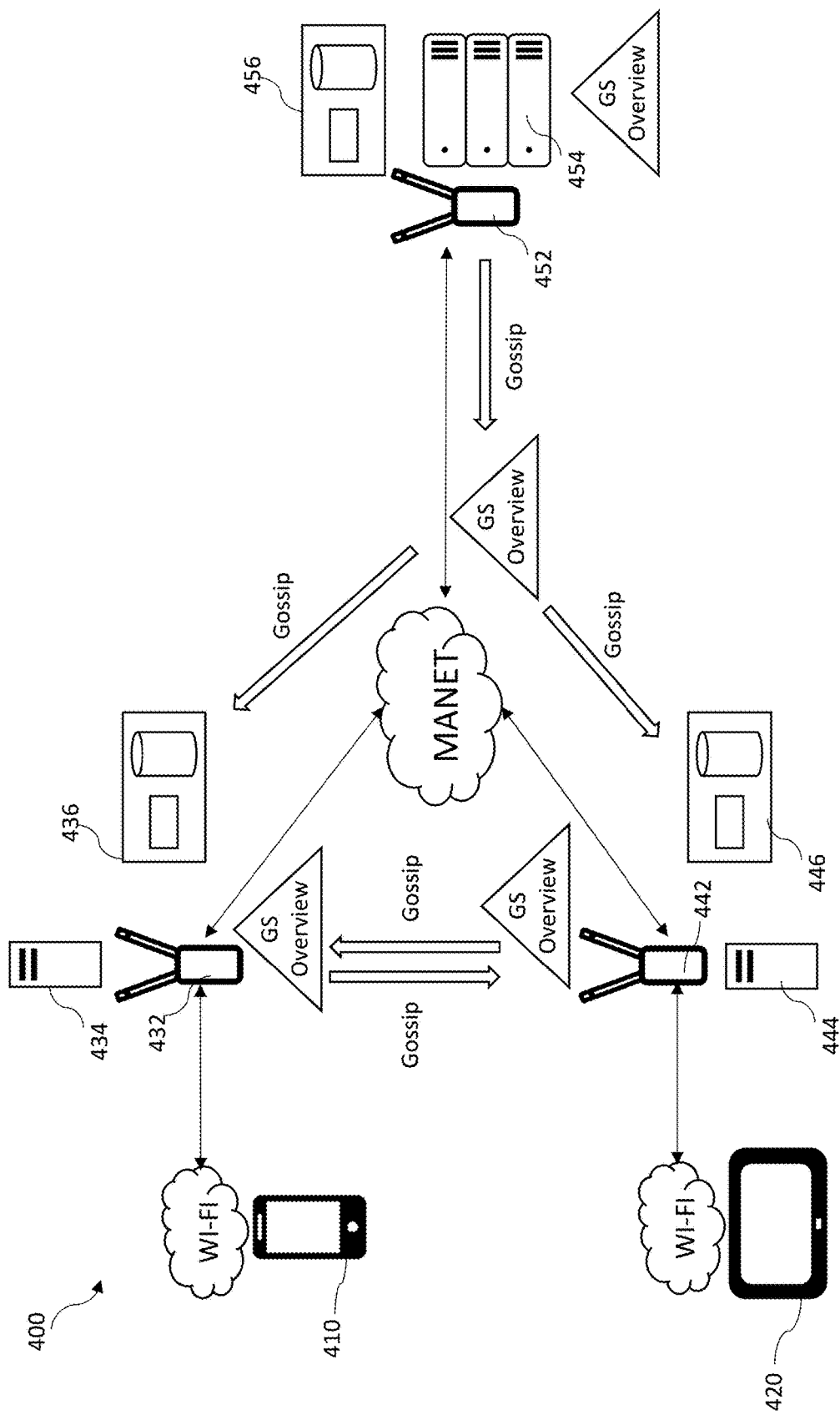
FIG. 12 continues the gunshot detection scenario of FIG. 11.

Node 3 456 then gossips the GS Overview data to Node 1 436 and Node 2 446 as shown in FIG. 12. Node 1 436 gossips the GS Overview data to Node 2 446, and Node 2 446 gossips the GS Overview data to Node 1 436. The gossip system ensures that Node 1 436, Node 2 446, and Node 3 456 each have a copy of GS-1, GS-2, and the GS Overview data. Further, this data is operable to be shared with planes, vehicles (e.g., tank, Humvee), command centers, etc. in the field.

The GS Overview data is operable to be used to determine at least one response to the gunshot. For example, the GS Overview data is transmitted to a first laser rangefinder and/or a first ballistic solver, which provides a first aiming correction for a first operator, a second laser rangefinder and/or a second ballistic solver, which provides a second aiming correction for a second operator, etc.

Advantageously, if there is an accusation that soldiers opened fire for no reason, the system is operable to reconstruct the gunshot scenario with an immutable record of all data captured by the at least one sensor, the at least one device, the at least one computer, the at least one server, and/or the at least one node. Again, because the system uses both a digital signature and witness nodes prior to hashing, data integrity is preserved.

The federated tactical edge cloud of the present invention is not restricted to military use. In one example, the federated tactical edge cloud is used to provide security for an event (e.g., athletic event, concert, theater performance, political rally) and/or a location (e.g., power plant, data center, government facility). In another example, the federated tactical edge cloud is used with first responders (e.g., police, firefighters, paramedics, medical personnel) responding to an emergency (e.g., accident, terrorist attack, building collapse). In yet another example, the federated tactical edge cloud is used for disaster relief (e.g., hurricane, earthquake, etc.).

The federated tactical edge cloud is operable to access and process data from a plurality of sources including, but not limited to, at least one physiological sensor, at least one environmental sensor, at least one firearm sensor, a GPS device, an accelerometer, a light sensor, a microphone, a thermometer, a clock, a compass, and/or a camera (e.g., video camera, still camera). The at least one physiological sensor includes, but is not limited to, a heart rate sensor, a blood pressure sensor, a temperature sensor (e.g., a skin temperature sensor), a galvanic skin response sensor, a sweat sensor, an analyte sensor, a respiration sensor (e.g., Piezo-Electric Respiratory Effort Belt, Respiratory Inductance Plethysmography band, optical sensor), and/or a pulse oximeter. The at least one environmental sensor includes, but is not limited to, a radiation sensor, a chemical sensor (e.g., airborne chemicals), a pressure sensor, a temperature sensor, a humidity sensor, a water sensor (e.g., water quality), a seismic sensor, a noise sensor, a radiofrequency sensor, a light sensor, and/or an odor sensor (e.g., blood, urine, feces, body odor). Advantageously, this allows for flexibility in deploying the federated tactical edge cloud for security, emergencies, and/or disaster relief applications.

Figure 13:
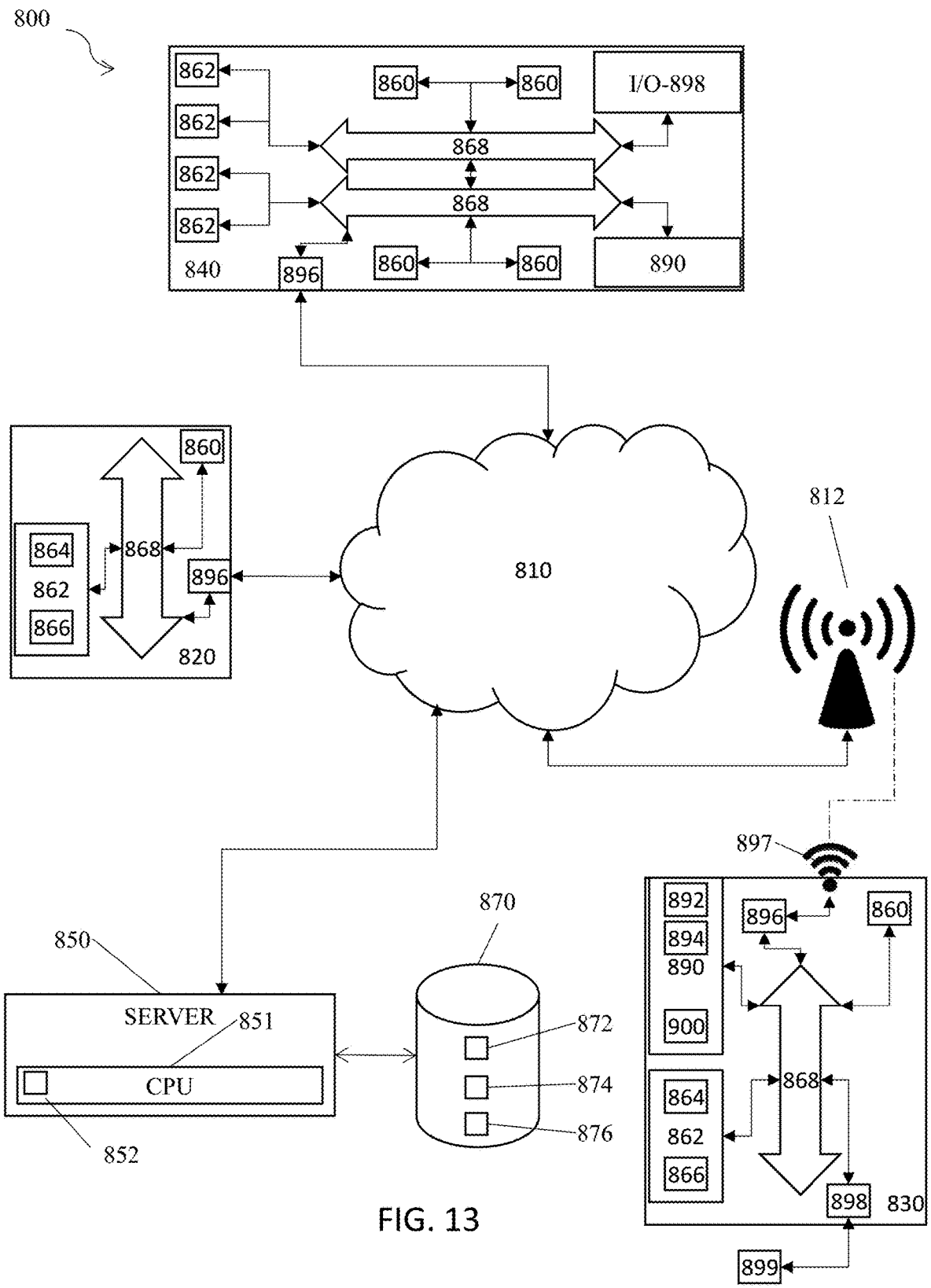
FIG. 13 is a schematic diagram of a system of the present invention.

FIG. 13 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 13, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 13, is operable to include other components that are not explicitly shown in FIG. 13, or is operable to utilize an architecture completely different than that shown in FIG. 13. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A method of providing a federated tactical edge cloud comprising:
   providing a content-addressed network including at least one node, wherein each of the at least one node is connected to at least one other node, wherein each of the at least one node is a zero-configuration edge node, wherein the network further includes at least one device, at least one radio, at least one computer, and/or at least one server, and wherein the network deploys serverless functions for the at least one device, at least one radio, at least one computer, and/or at least one server via the at least one node;
   a first node of the at least one node generating at least one new data block populated with data and signing the data with a signature, wherein the signature is appended to the at least one new data block;
   wherein the at least one new data block includes a parent block and at least one child block, and wherein the parent block includes links to all child blocks;
   hashing the data using an algorithm, thereby creating a hash of the data;
   signing the hash of the data using an encoded digital signature and appending the encoded digital signature to the at least one new data block;
   sending a signature request to a randomly selected set of peer nodes of the at least one node including the hash of the data;
   each of the randomly selected set of peer nodes extracting the hash of the data and signing the hash of the data using a peer encoded digital signature, thereby creating a peer signed hash of the data;
   validating the peer encoded digital signature and appending the peer encoded digital signature to the at least one new data block for each of the randomly selected set of peer nodes;
   generating a block identification by hashing the at least one new data block with the peer encoded digital signature from each of the randomly selected set of peer nodes; and
   gossiping existence of the at least one new data block to adjacent nodes.

2. The method of claim 1, further including collecting sensor data from at least one sensor.

3. The method of claim 2, wherein the at least one sensor includes a Global Positioning System (GPS) device, an accelerometer, a light sensor, a microphone, a thermometer, a clock, a compass, at least one range sensor, at least one laser rangefinder, at least one ballistic solver, at least one elevation sensor, at least one altitude sensor, at least one camera, at least one physiological sensor, at least one environmental sensor, and/or a firearm status sensor.

4. The method of claim 2, wherein one or more of the at least one sensor is incorporated in the at least one device.

5. The method of claim 1, wherein the at least one node is in wired and/or wireless communication with the at least one computer and/or the at least one server.

6. The method of claim 1, further including one or more of the adjacent nodes requesting the at least one new data block from the first node.

7. The method of claim 1, further including one or more of the adjacent nodes gossiping existence of the at least one new data block to at least one additional node.

8. The method of claim 1, wherein the at least one new data block includes metadata, and wherein the metadata includes node information, at least one link to another data block, and/or a number of cryptographic signatures and node identities.

9. The method of claim 1, further including encrypting communication between nodes using public key cryptography.

10. The method of claim 1, wherein one or more of the adjacent nodes is operable to purge at least one data block to store the at least one new data block.

11. The system of claim 1, wherein each child block of the child blocks has a maximum size, wherein the maximum size is configurable.

12. A method of providing a federated tactical edge cloud comprising:
   providing a content-addressed network including at least one node and at least one sensor, wherein each of the at least one node is connected to at least one other node, wherein each of the at least one node is a zero-configuration edge node, and wherein the network further includes at least one device, at least one radio, at least one computer, and/or at least one server, and wherein the network deploys serverless functions for the at least one device, at least one radio, at least one computer, and/or at least one server via the at least one node;
   a first node of the at least one node generating at least one new data block populated with data and signing the data with a signature, wherein the signature is appended to the at least one new data block;
   wherein the at least one new data block includes a parent block and at least one child block, and wherein the parent block includes links to all child blocks;
   hashing the data using an algorithm, thereby creating a hash of the data;

signing the hash of the data using an encoded digital signature and appending the encoded digital signature to the at least one new data block;

sending a signature request to a randomly selected set of peer nodes of the at least one node including the hash of the data;

each of the randomly selected set of peer nodes extracting the hash of the data and signing the hash of the data using a peer encoded digital signature, thereby creating a peer signed hash of the data;

validating the peer encoded digital signature and appending the peer encoded digital signature to the at least one new data block for each of the randomly selected set of peer nodes;

generating a block identification by hashing the at least one new data block with the peer encoded digital signature from each of the randomly selected set of peer nodes; and gossiping existence of the at least one new data block to adjacent nodes;

wherein communication between nodes is encrypted using public key cryptography.

13. A system for providing a federated tactical edge cloud comprising:

A content-addressed network including at least one node, wherein each of the at least one node is connected to at least one other node, wherein each of the at least one node is a zero-configuration edge node, wherein the network further includes at least one device, at least one radio, at least one computer, and/or at least one server, and wherein the network deploys serverless functions for the at least one device, at least one radio, at least one computer, and/or at least one server via the at least one node;

wherein a first node of the at least one node is operable to generate at least one new data block populated with data and sign the data with a signature, wherein the signature is appended to the at least one new data block;

wherein the at least one new data block includes a parent block and at least one child block, and wherein the parent block includes links to all child blocks;

wherein the first node is operable to hash the data using an algorithm, thereby creating a hash of the data;

wherein the first node is operable to sign the hash of the data using an encoded digital signature and append the encoded digital signature to the at least one new data block;

wherein an event handler is operable to send a signature request to a randomly selected set of peer nodes of the at least one node including the hash of the data;

wherein each of the randomly selected set of peer nodes is operable to extract the hash of the data and sign the hash of the data using a peer encoded digital signature, thereby creating a peer signed hash of the data;

wherein the first node is operable to validate the peer encoded digital signature and append the peer encoded digital signature to the at least one new data block for each of the randomly selected set of peer nodes;

wherein the first node is operable to generate a block identification by hashing the at least one new data block with the peer encoded digital signature from each of the randomly selected set of peer nodes; and wherein the event handler is operable to gossip existence of the at least one new data block to adjacent nodes.

14. The system of claim 13, wherein the network further includes at least one sensor.

15. The system of claim 14, wherein the at least one sensor includes a Global Positioning System (GPS) device, an accelerometer, a light sensor, a microphone, a thermometer, a clock, a compass, at least one range sensor, at least one laser rangefinder, at least one ballistic solver, at least one elevation sensor, at least one altitude sensor, at least one camera, at least one physiological sensor, at least one environmental sensor, and/or a firearm status sensor.

16. The system of claim 14, wherein one or more of the at least one sensor is incorporated in the at least one device.

17. The system of claim 13, wherein the at least one node is in wired and/or wireless communication with the at least one computer and/or the at least one server.

18. The system of claim 13, wherein the peer encoded digital signature is validated using a public key from each of the randomly selected set of peer nodes.

19. The system of claim 13, wherein communication between nodes is encrypted using public key cryptography.

* * * * *